United States Patent [19]
Colwell et al.

[11] Patent Number: 5,179,680
[45] Date of Patent: Jan. 12, 1993

[54] INSTRUCTION STORAGE AND CACHE MISS RECOVERY IN A HIGH SPEED MULTIPROCESSING PARALLEL PROCESSING APPARATUS

[75] Inventors: Robert P. Colwell; John O'Donnell; David B. Papworth, all of Guilford; Paul K. Rodman, Madison, all of Conn.

[73] Assignee: Digital Equipment Corporation, Maynard, Mass.

[21] Appl. No.: 707,917

[22] Filed: May 30, 1991

Related U.S. Application Data

[60] Division of Ser. No. 476,108, Jan. 30, 1990, Pat. No. 5,057,837, which is a continuation of Ser. No. 41,047, Apr. 20, 1987.

[51] Int. Cl.$^5$ ............................................. G06F 12/08
[52] U.S. Cl. ..................... 395/425; 364/DIG. 1; 364/243.4; 364/243.41; 364/243; 364/259.9; 364/259.7; 364/259; 364/262.81; 364/262.4; 364/260.6; 364/260.4
[58] Field of Search ............... 395/425, 400, 250, 725, 395/775

[56] References Cited

U.S. PATENT DOCUMENTS

| | | | |
|---|---|---|---|
| 3,694,813 | 9/1972 | Loh et al. | 340/172.5 |
| 3,805,254 | 4/1974 | Schuur | 340/172.5 |
| 4,064,559 | 12/1977 | Kawanabe | 364/900 |
| 4,327,379 | 4/1982 | Kadakia et al. | 341/60 |
| 4,371,951 | 2/1983 | Kort et al. | 364/900 |
| 4,400,791 | 8/1983 | Kitado | 364/900 |
| 4,433,377 | 2/1984 | Eustis et al. | 364/200 |
| 4,437,149 | 3/1984 | Pomerene et al. | 364/200 |
| 4,464,650 | 8/1984 | Eastman et al. | 340/347 |
| 4,494,151 | 1/1985 | Liao | 341/63 |
| 4,545,032 | 10/1985 | Mak | 364/900 |
| 4,593,267 | 6/1986 | Kuroda et al. | 340/347 |
| 4,644,545 | 2/1987 | Gershenson | 371/38 |
| 4,933,837 | 6/1990 | Freidin | 364/200 |

OTHER PUBLICATIONS

Fisher, "The VLIW Machine: A Multiprocessor for Compiling Scientific Code", *Computer*, Jul. 1984 pp. 45-53.

Fisher et al., "Parallel Processing: A Smart Compiler and a Dumb Machine", Dept. of Computer Science, Yale University.

Riseman et al., "The Inhibition of Potential Parallelism by Conditional Jumps", IEEE Transactions on Computers, Dec. 1972, Short Notes pp. 1405-1415.

Fisher et al., "VLIW Machines: Multiprocessors We Can Actually Program", Dept. of Computer Science, Yale University.

Tjaden et al., "Detection and Parallel Execution of Independent Instructions", IEEE Transactions on Computers, vol C-19, No. 10 Oct. 1970, pp. 889-895.

Hack, "Peak vs. Sustained Performance in Highly Concurrent Vector Machines", *Computer*, Sep. 1986, pp. 11-19.

Amdahl, "Validity of the Single Processor Approach to Achieving Large Scale Computing Capabilities", Spring Joint Computer Conf., 1967 pp. 483-485.

Fisher, "The Optimization of Horizontal Microcode Within and Beyond Basic Blocks: An Application of Processor Scheduling with Resources", U.S. Dept of Energy Report, Mathematics and Computing, COO-3077-161.

*Primary Examiner*—Kevin A. Kriess
*Attorney, Agent, or Firm*—Denis G. Maloney; Barry Young; Ron Myrick

[57] ABSTRACT

A method and apparatus for storing an instruction word in a compacted form on a storage media, the instruction word having a plurality of instruction fields, features associating with each instruction word, a mask word having a length in bits at least equal to the number of instruction fields in the instruction word. Each instruction field is associated with a bit of the mask word and accordingly, using the mask word, only non-zero instruction fields need to be stored in memory. The instruction compaction method is advantageously used in a high speed cache miss engine for refilling portions of instruction cache after a cache miss occurs.

3 Claims, 18 Drawing Sheets

M = MASK WORD
P = PACKET
X = PAD ZEROS
WORD = 32 BITS

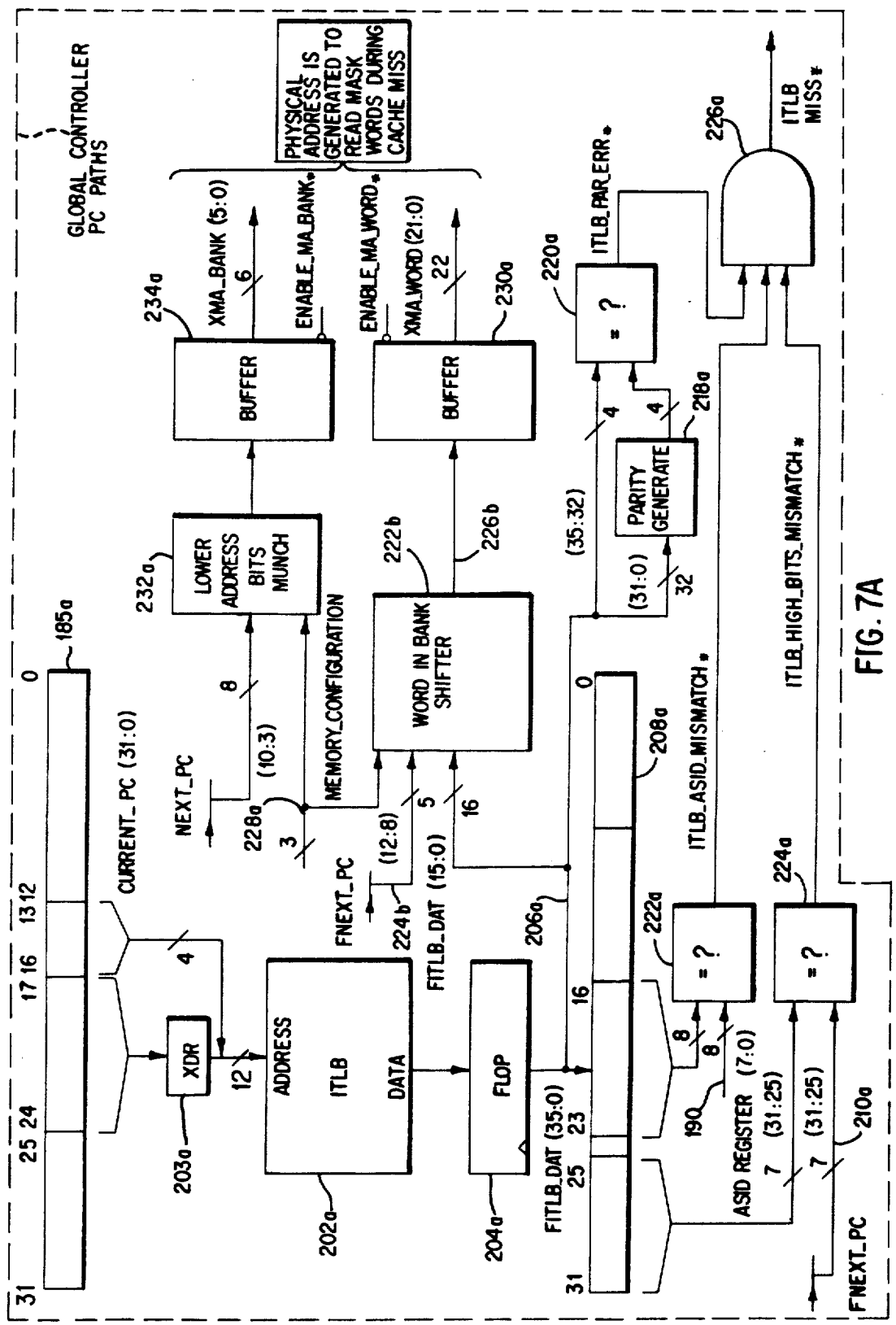

FIG. 14

INSTRUCTION STORAGE AND CACHE MISS RECOVERY IN A HIGH SPEED MULTIPROCESSING PARALLEL PROCESSING APPARATUS

This is a division of application Ser. No. 07/476,108, filed Jan. 30, 1990 now U.S. Pat. No. 5,057,837, which is a continuation of application Ser. No. 07/041,047, filed Apr. 20, 1987.

BACKGROUND OF THE INVENTION

The invention relates generally to computing apparatus and methods and in particular to a method and apparatus for storing machine instructions and for detecting and correcting an instruction cache miss in a data processing system.

In an apparatus which uses a very long instruction word (VLIW) such as that employed in implementing a Trace Scheduling method and which has an instruction word length of over 1,000 bits, a major architectural consideration is the massive storage and bandwidth demands of the system. Storage is required for the instructions themselves and the bandwidth is required to direct the instruction data at high bit rates, to where it is needed during each cycle of operation. Typical data processing systems employ an instruction cache to increase the processor throughput, and it is expected that, in theory, most instructions in a sequence will be stored in the instruction cache memory which operates at a very high access rate, typically on the order of thirty nanoseconds in present day apparatus.

Traditionally, designers of wide instruction word computers have dealt with the problem of bandwidth through compromise, and therefore, have limited the instruction word width. A primary technique for limiting the word width attempts to anticipate which individual instructions will typically be combined in a single long instruction and provides compact instruction encodings for those cases, but only those cases. Such guesses, in our experience, prove almost universally to be wrong. Consequently processors are built that, even in the inner loops of a program where substantial parallelism is available, achieve only a small portion of their potential performance (without use of exhaustive hand coding). Thus, requiring a compiler to find and use the "patterns," that the machine designer guessed would be used, simply does not work.

It is also important in such apparatus to provide for a high speed mechanism to fill instruction cache memory should an instruction not be present. This process is relatively simple when the instructions are being loaded from a known, fixed format memory. In accordance with the present invention, however, in order to save memory space, a variable length memory format is employed which requires substantial computation and cataloging in order to refill the cache memory at a significant high data rate. The development of a corresponding high speed cache refill mechanism when the original instruction data has a variable length structure, is quite difficult.

An object of the invention is therefore an instruction storage and cache miss recovery method and apparatus, for a very long instruction word, which reduces or minimizes the main storage requirements for the very long instruction word. Other objects of the invention are a method and apparatus for enabling high speed, reliable refill of a fixed word length instruction cache from a variable length instruction memory storage. Further objects of the invention are a parallel processing multiprocessor system having a very long instruction word which reliably and at high speed implements a cache miss engine for filling a distributed instruction cache.

SUMMARY OF THE INVENTION

The invention relates to a method for storing an instruction word in a compacted form in a storage media. The instruction word has a plurality of instruction operation fields. The invention features associating with each instruction word a mask word, the mask word having a length in bits at least equal to the number of instruction fields in the instruction word. The method further features associating a bit of the mask word with each instruction field, marking each associated bit with a first designation when the associated instruction field is a non-zero field, and with a second designation when the associated instruction field is a zero field. The method further features storing, as a representation of the instruction word, the mask word and each non-zero instruction field.

In a particular aspect of the method, there are featured the steps of providing the mask word with a length equal to the length of an instruction field and associating each mask word with a number of fields equal to the number of bits in the mask word. In another aspect, instruction words can be associated together as a word grouping and a plurality of mask words can be employed to describe each long word grouping in a compacted form. In this embodiment, for example, the method can employ the step of formatting the representation in the storage media so that the representation begins with a mask word and begins on a modulo-4 word boundary. Each further mask word of the compacted representation can follow in a selected order and begin on a modulo-2 word boundary.

In another aspect of the invention, a cache miss engine for refilling instruction cache, when the compacted form of storage is employed in main memory, has an interleaved memory system. The memory system includes a plurality of memory controllers with each controller controlling a plurality of memory banks, and the memory system being able to output a plurality of data words at each machine cycle. The cache miss engine further has at least one control processing unit. The instruction cache stores the plurality of instruction fields making up an instruction word in a distributed fashion. The instruction words are stored in the memory system in a variable length format and are stored in the instruction cache in a fixed length format. The variable length format includes a decoding key (the mask word) and a plurality of fixed length non-zero instruction fields. The cache miss engine features circuitry for reading the decoding key, circuitry for reading the instruction fields in a block mode for transmission to the distributed instruction cache, circuitry for decoding the decoding key for generating destination tags to be associated with each of the read instruction fields, and circuitry for associating one of the destination tags with each read instruction field for denoting a storage destination of the instruction field in the instruction cache.

The cache miss engine further features timing circuitry for providing the destination tag for simultaneous transmission with the associated instruction field on a system bus.

In another aspect, wherein the data processing system has a plurality of processors, the cache miss engine associating circuitry further has identifying circuitry for placing, in the destination tag, the data processor and distributed cache memory section to which the associated instruction field is directed.

BRIEF DESCRIPTION OF THE DRAWINGS

Other objects, features, and advantages of the invention will appear from the following description taken together with the drawings in which:

FIG. 7A is an electrical block diagram showing the instruction table lookup operation and address generation according to a preferred embodiment of the invention;

FIG. 14 electrical block diagram detailing the elements of the integer unit history queues according to a preferred embodiment of the invention;

DESCRIPTION OF A PREFERRED EMBODIMENT

General Structure and Operation

Figure 1:
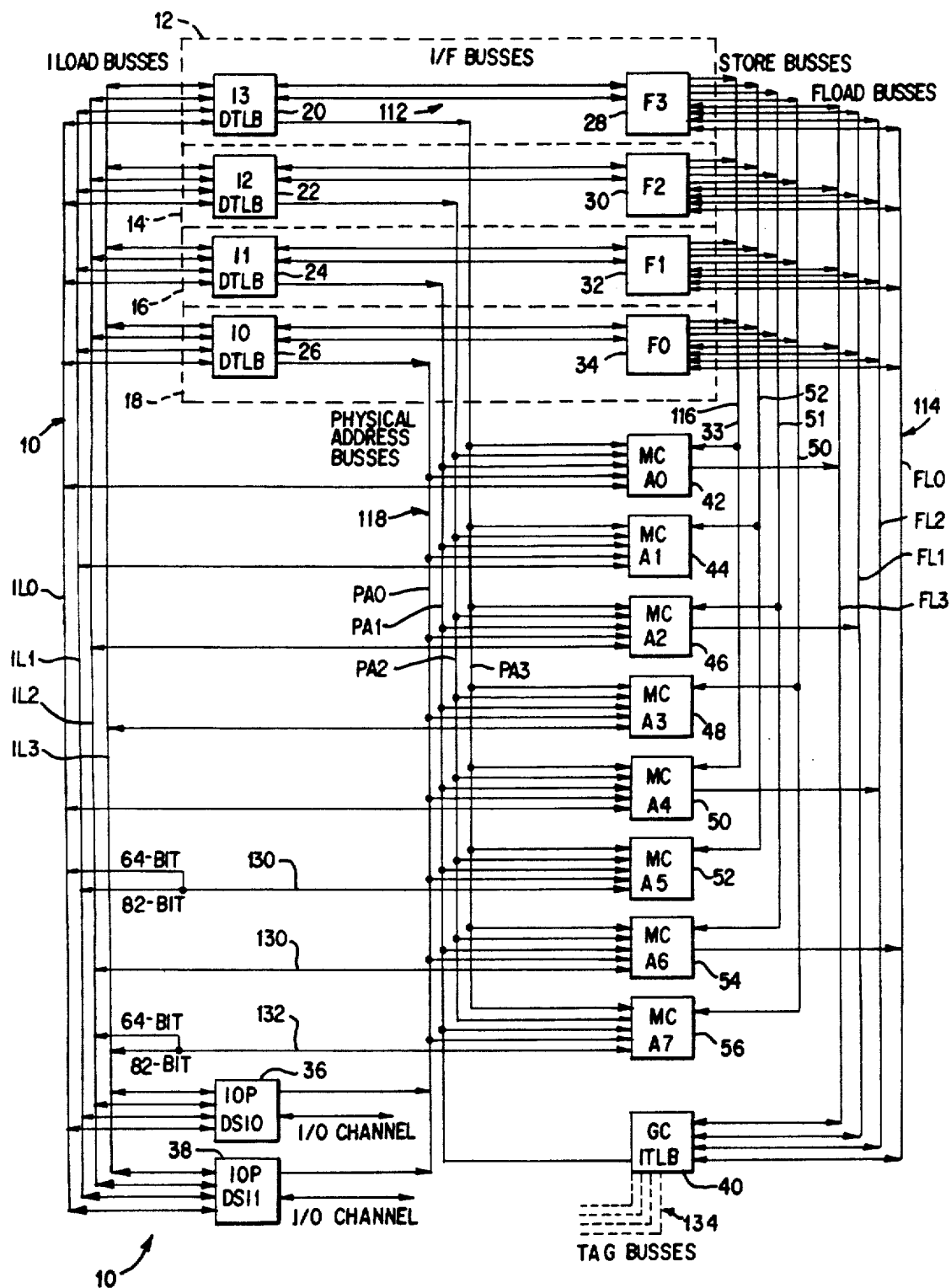
FIG. 1 is an electrical block diagram of the overall structure of a computer system in accordance with a preferred embodiment of invention.

Referring to FIG. 1, a computer system or data processor 10 has a central processing unit (CPU) 11 having a plurality of clusters 12, 14, 16, 18, each cluster having an integer or I-unit processor 20, 22, 24, 26, and a floating point or F-unit processor 28, 30, 32, and 34, respectively. The central processing unit interconnects with input/output processors 36 and 38, a global controller 40, and a plurality of memory systems 42, 44, 46, 48, 50, 52, 54, and 56. In other embodiments of the invention, more or fewer clusters, input/output processors, and memory systems can be employed.

Figure 2:
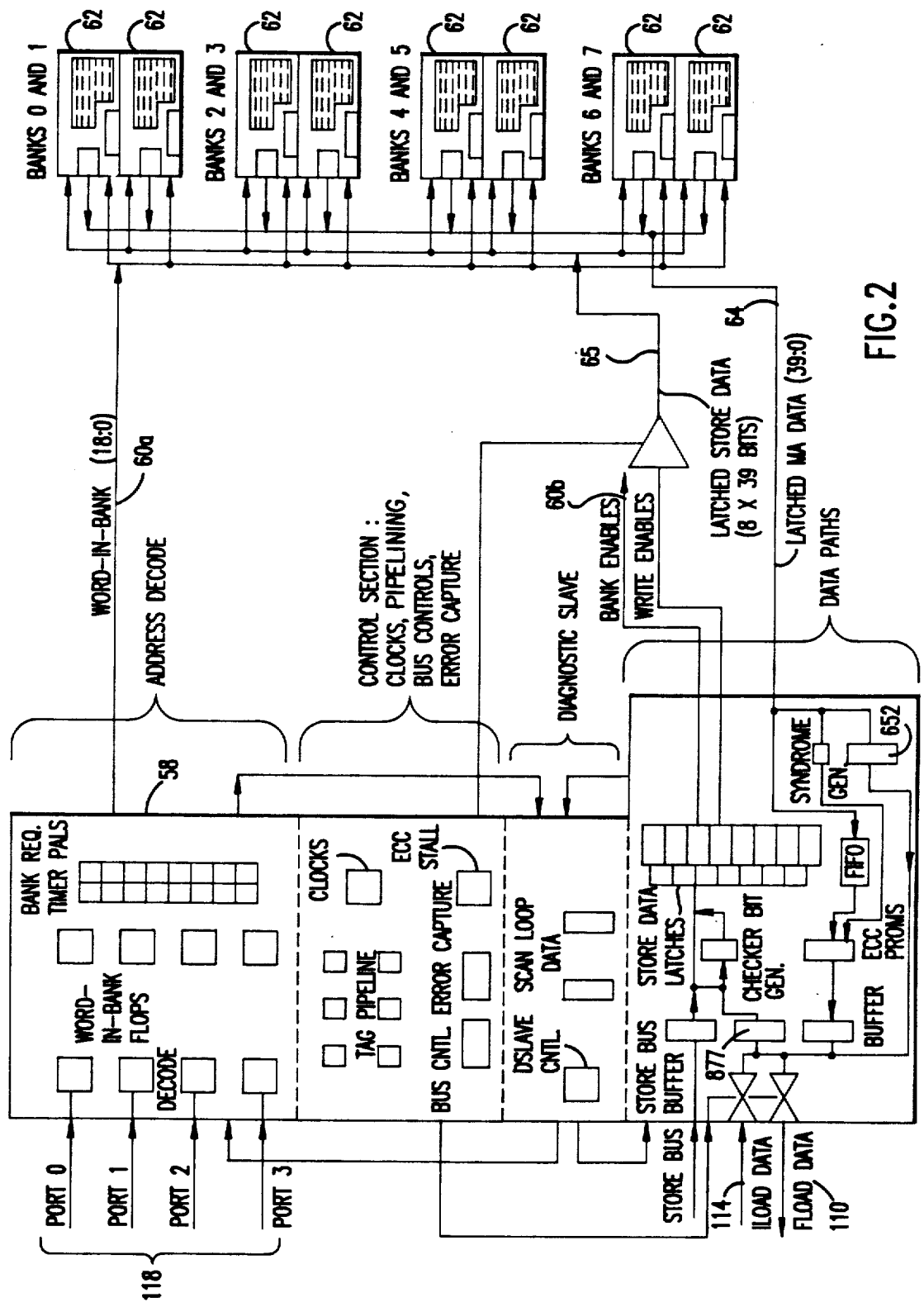
FIG. 2 is an electrical block diagram of a memory system in accordance with a preferred embodiment of the invention.

Referring to FIG. 2, each memory system has a memory controller 58 for accepting memory reference requests from, for example, the central processing unit and for generating the necessary control signals over lines 60a, 60b to access dynamic random access memory chips. The memory chips are organized into blocks of memory 62 and each controller 58 can control up to eight memory blocks, called "banks." Each word of memory is thus addressed by its controller number, its bank number, and the word number of the particular bank (the "word-in-bank"). The number of controllers, as well as the number of banks associated with each controller, can vary with the configuration of the system. Referring to FIG. 1, a preferred memory configuration has eight memory controllers 58, each of which can receive data from the central processing units and provides output data to the various units of the system. Each memory controller provides access to each memory bank 62 over the lines 60a and 60b and receives the result of the addressing inquiry over lines 64 and provides data for storage to its banks over lines 65. In the illustrated embodiment of the invention, each memory bank 62 stores two million bytes of data; in accordance with the preferred embodiment of the invention, the memory is advantageously interleaved.

In accordance with the illustrated embodiment of the invention, each memory controller 58 provides a multistage pipeline which generates the necessary control signals to access the proper dynamic RAM of memory banks 62. The memory write operation is a pipelined write procedure which provides for storing data in four beats of the equipment. The cycle time for storing a word is about 240 nanoseconds for the components used in the illustrated embodiment. Because the DRAM's are busy throughout this period, only one write request can be processed during the interval.

Referring again to FIG. 1, the input/output processors 36 and 38, in the illustrated embodiment, act as the interface between the CPU and memory on one hand, and an external device such as an external computer on the other. The external device can be a computer which communicates with various other input/output peripheral equipment such as tape drives and terminals. The input/output units also provide for direct-memory access (DMA) transfers of data between memory and the input/output device. The input/output processor uses a so-called "DMA engine" to control data flow and operate a protocol sequence as is well known in the art. The input/output processor can contain, and preferably does contain, its own microprocessor which controls the timing of program interrupts and schedules the transfer of data using internal buffers.

A primary function of the global controller is to provide the program counter which generates the next instruction address. The global controller also "orchestrates" the process of filling the instruction cache from main memory during an instruction cache miss. Thus, if a required instruction is not found in the instruction cache during program execution, that instruction must be obtained from memory and the global controller asserts control over the various buses to quickly transfer instruction data from main memory to the instruction cache. The global controller, in the illustrated embodiment, further has an instruction table lookup buffer (ITLB) for storing a record of which "pages" of instructions are currently in memory and the locations in slower, for example disk memory from which they were obtained.

Figure 3:
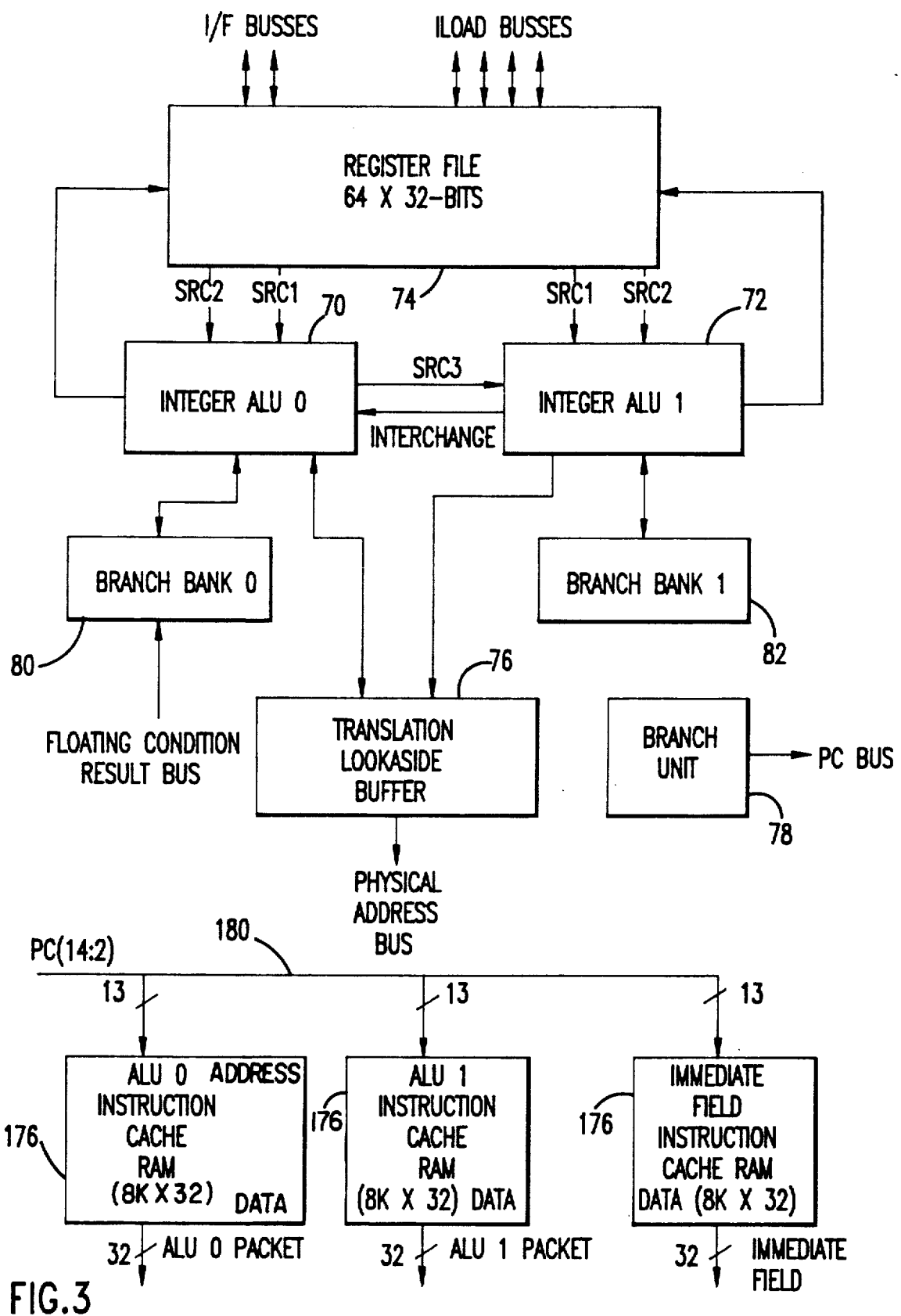
FIG. 3 is a block diagram of the integer processor in accordance with a preferred embodiment of the invention.

Each cluster, according to the invention, has, as noted above, an integer processor and a floating point processor. Referring to FIG. 3, each integer processor handles integer computation as well as other logic functions. The integer processor, in the illustrated embodiment, includes two independent arithmetic logic units 70, 72 (designated ALU0 and ALU1 respectively), a 64×32-bit register file 74, a virtual to physical address data translation lookaside buffer 76, a branch unit 78, and a first and a second branch bank 80, 82, respectively. (Each branch bank of the illustrated embodiment is an 8×1-bit register for storing branch condition data from the arithmetic logic units 70, 72 respectively.) The integer processor further includes a section 84 of a distributed instruction cache memory.

Functionally, the translation lookaside buffer translates virtual memory addresses from the ALU's to physical memory addresses using a table lookup mechanism well known to those practiced in the art, and the instruction cache memory provides the ALU's with faster access to instructions than would be possible if the instructions had to be read from memories 42, . . . , 56 for every cycle of the processor. The register file 74 is, according to the illustrated embodiment of the invention, divided into two sub-banks. One sub-bank of thirty-two 32-bit registers is associated solely with arithmetic logic unit 70 and the other sub-bank is associated solely with arithmetic logic unit 72. The branch bank circuitry 80, 82, and the branch unit 78 are employed during multiway branch operations also described in more detail hereinafter.

Figure 4:
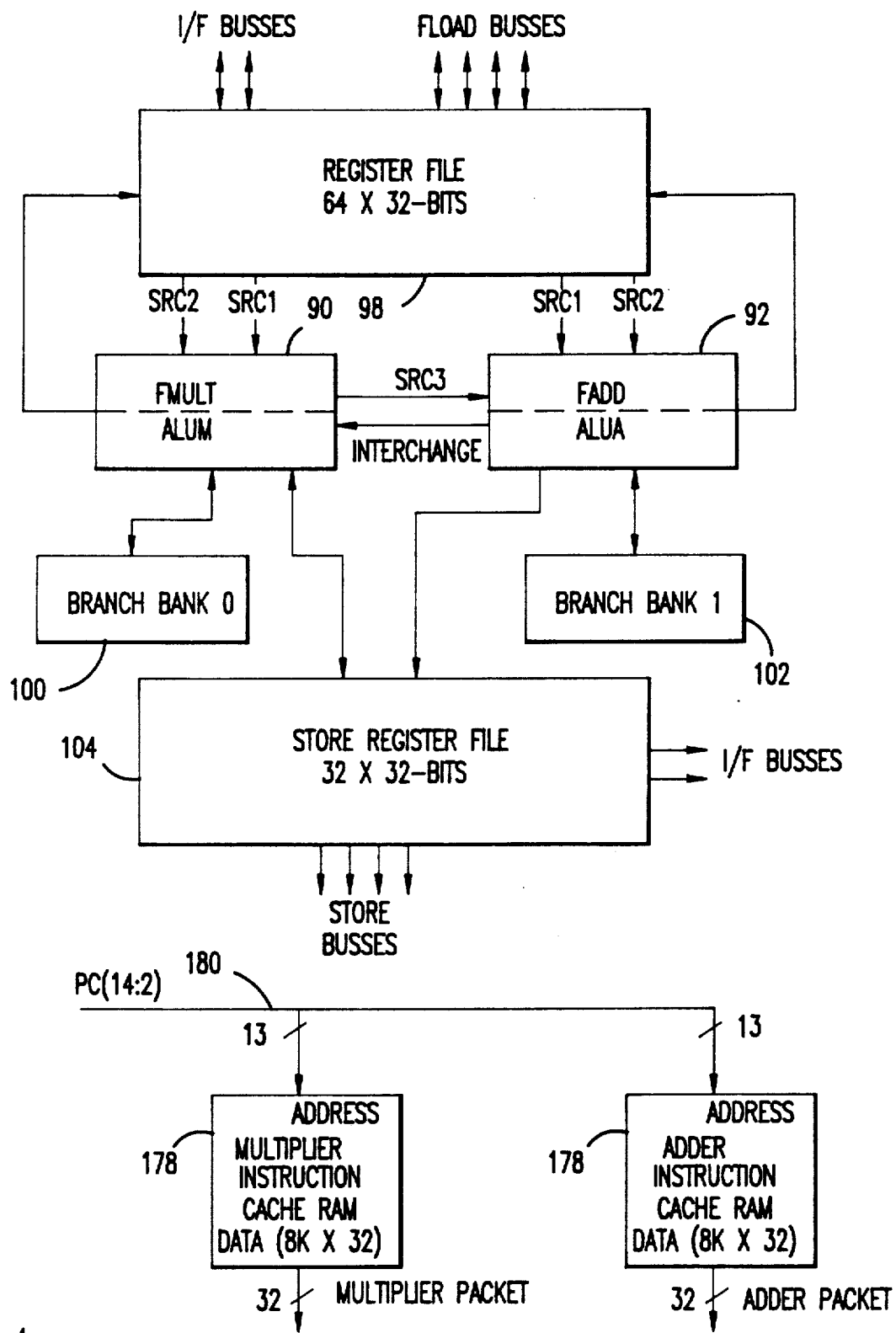
FIG. 4 is an electrical block diagram of a floating point processor in accordance with a preferred embodiment of the invention.

Referring to FIG. 4, the floating point processor has a floating point multiplier and arithmetic logic unit 90, and a floating point adder and arithmetic logic unit 92. Each floating point processor further includes a register file of sixty-four 32-bit registers that is divided in half in the same manner as integer processor register file 74. The floating point adder and arithmetic logic unit 92 has access to source operands in one half of the register file 98 and the floating point multiplier and integer arithmetic logic unit 92 has access to the source operands in the other half of the register file. There are in addition a first and second branch bank units 100, 102, respectively, and a memory store register file 104 which, in the illustrated embodiment consists of thirty-two 32-bit registers. The memory store register file is used by the integer and floating point processors of a cluster and is the path by which data can be stored in memory 42, . . . , 56. The branch banks 100, 102, like the corresponding branch banks 80, 82 of the integer processor, comprise a set of eight one-bit registers that store condition codes resulting from arithmetic logic unit operations. These codes can be used in branch determination.

Referring to FIG. 1, in the illustrated embodiment, the CPU preferably has four clusters. This is referred to, in the illustrated embodiment, as a four-wide system. In other embodiments according to the invention, the number of clusters, and their architecture, can vary. In particular, there can be for example one or two clusters, designated a one-wide or a two-wide system, respectively. The number of memory controllers and the number of banks per controller depend upon the number of clusters. For a "one-wide" processor, one might select two memory controllers, each having four banks of memory. Other configurations are within the skill of one practiced in the art.

In accordance with the invention, the hardware architecture described in connection with FIGS. 1-4 is known to the compiler which generates program code for the system. In the illustrated embodiment, the program code is in the form of a sequence of 1,024 bit instruction words for the preferred four-wide system. If fewer than four clusters are used, the width of the instruction word can be accordingly reduced. (Thus, a two-wide system employs a 512-bit instruction word and a one-wide system employs a 256-bit instruction word.) Each instruction word has a plurality of operation fields (generally ALU instructions) and the goal of the compiler is to fill as many fields of the instruction word as possible so that each of the ALU's is occupied, executing an instruction for each beat of the equipment. The compiler stores resource information such as resource restrictions, including access times, number of buses, and the number of available registers. The compiler produces an execution code that optimizes resource allocation.

In operation, the compiler uses the Trace Scheduling method to analyze the flow of a program and to predict which paths the program will take. These predictions include statistical guesses about conditional branches. The compiler develops plots or traces of program flow and, where necessary, multiple traces, each with a calculated probability of being correct, are generated to describe the expected program sequence. The compiler uses various methods to select the best of the multiple projected traces and calls upon a "disambiguator" to assist in creating code that has parallel structure. The disambiguator method decides whether or not implied memory references result in a program conflict, that is, whether or not memory references can be executed in parallel.

For example, if the program refers to variables "I" and "J," the compiler must know, if possible, whether these variables will refer to the same memory location. If they do not, the operations to which they relate can most likely be executed in parallel (unless they depend on each other's results). Thus, operations such as "write I" and "read J" can generally be performed concurrently if "I" and "J" are independent of each other at that execution step in the program. If, however, "I" and "J" translate to the same location in physical memory (and in the illustrated embodiment, to the same memory controller), the two operations must be executed sequentially. Accordingly, the more situations the disambiguator can disambiguate, the more the code can be made to run in parallel. The Trace Scheduling method is described in detail in Ellis, John, *Bulldog: A Compiler*

*for VLIW Architectures,* Yale University-DCS-RR-364, Feb. 1985.

In the illustrated embodiment, the compiler further permits the programmer to make "assertions" about the variables used in the program. The programmer can assert, for example, that two variables are never equal or are not equal at some point in his program and thereafter. These assertions increase the ability of the compiler to generate parallel code because they reduce the uncertainty about the memory references that ultimately force code to be made sequential.

Also, as in the case of memory reference disambiguation, programmer assertions can assist the compiler in the case of memory bank disambiguation. Since the memory has an interleaved structure for providing a higher memory bandwidth, and since multiple banks can be accessed simultaneously by the various ALU's, the assertion that the difference between two variables will never be zero modulo N, where N is the number of banks in the system, guarantees that the same memory bank will not be accessed twice in the same beat.

A further, more severe restriction exists, however, as noted above, that a memory controller cannot be referenced more than once in a single cycle. This poses a "problem" for the compiler, since it cannot schedule in parallel two operations that reference the same memory controller. Therefore, the compiler can make parallel only those memory operations in which memory locations, if accessed, are accessed through different memory controllers. Thus, for example, writing code that accesses word N and word N+M in the same beat, of a system which is configured with a total of M banks, would cause a bank conflict as well as a memory controller conflict.

There also exists a stall condition that results from two or more references to the same memory bank within four beats. During a so-called a "bank stall," the CPU is set to an idle state due to the latency in the memory pipelines. The compiler, to the extent possible, avoids scheduling operations that cause bank stalls, but the occurrence of such an event is not fatal to program execution as are concurrent calls to the same memory controller. The bank stall mechanism is discussed in more detail below.

The Bus Architecture

The full capability of the apparatus components illustrated in FIG. 1 is only fully realized by use of an extensive and unique bus structure, with its associated control. In the illustrated embodiment of the invention, there are five categories of system buses. Each bus of a category is thirty-two data bits wide in the illustrated embodiment; and some buses have associated therewith additional data lines as indicated by a parallel dashed data path.

The integer processors receive data from a set of integer load buses 110, designated IL0, IL1, IL2, and IL3. In the illustrated embodiment there are four of these buses to which each of the integer processors connects. These buses can direct thirty-two bit data words from memories 42, . . . , 56 to the integer register file 98. The integer load buses also provide inter-integer processor communication.

Two 32-bit wide I/F buses 112 provide for communications between the integer and floating point processors of a cluster. The integer processors can receive data from the floating point processors through the connecting I/F buses 112. The I/F buses are also employed when the lower word of a sixty-four bit quantity is loaded into the floating point processor register files by connection through the integer processors.

The floating point processors can receive data from any of a plurality of thirty-two bit wide floating point load buses 114, designated FL0, FL1, FL2, and FL3. The floating point processors also employ the floating point load buses for inter-floating point processor communications.

The floating point processors can also deliver data from the store register file 104 to a plurality of store buses 116, designated as S0, S1, S2, and S3, for delivery to the memory system. Finally, the thirty-two bit wide physical address buses 118, which are designated PA0, PA1, PA2, and PA3, receive physical address data generated using the data table lookaside buffer 76 of the integer processor for addressing the memory system.

The outputs of memories 42 and 50, 44 and 52, 46 and 54, and 48 and 56, connect respectively to integer load buses IL0, IL1, IL2, and IL3. This provides for the simultaneous loading of the integer load buses with up to four 32-bit words or fields from the interleaved memory. In addition, however, memories 52 and 56 also connect respectively to bus lines IL0 and IL2 to provide the low order thirty-two bit data for a double precision sixty-four bit quantity. That data is transferred through the integer processors, along the I/F buses, to the floating point processor register file for processing. In addition, each input/output processor 36, 38 connects to each of the integer load buses for making direct memory access (DMA) transfers as discussed in more detail below.

As noted above, the floating point load buses provide a path from memory to the floating point processors. Only four of the eight memory controllers, however, need connect to the floating point buses, because the two transmissions from the memories to the floating point processors always use the same four memory controllers. In one case, the floating point load, a sixty-four bit data word load, one memory of a pair loads the most significant half of the sixty-four bit quantity through the floating point bus while its neighboring memory simultaneously loads the least significant portion of the sixty-four bit quantity onto the integer load bus for transmission through the integer processor and I/F bus to the floating point processor. (The sole exception to this process for loading a sixty-four bit wide word provides for the integer load buses to carry the full sixty-four bit number, as noted above. For example, memory units 54 and 56 provide a sixty-four bit load using the integer load buses IL2 and IL3 over lines 130 and 132.) In the second case, during operation of the cache miss engine (described in detail below) the same four memories provide mask word data to the floating point processors.

The I/F buses allow data to be forwarded from one side of a cluster to the other. Thus for sixty-four bit loads having a destination at a register in the floating point processor, the lower thirty-two bits of data will be transferred from memory, over an integer load bus, then through the I/F bus to the floating point processor. This is a fast forwarding path and the load is performed essentially without delay. (A forwarding bit in a register file tag accompanying the data (and provided by the global controller over the tag buses 134) indicates to the integer processor that the incoming data is to be forwarded to the floating point processor over an I/F bus.) In another application, the I/F buses provide the communications link for transmitting data to be written to memory from the integer processor to the floating point processor, since any data to be stored in or written to memory from the integer processor must first be loaded into the store register file 104 of the floating point processor.

In accordance with the invention, when data is to be written into the floating point store register file from the integer processor, the storage instruction has associated therewith a plurality of address data including, in the illustrated embodiment, two bits to identify the store register file being used (that is, the cluster), five bits (in the illustrated embodiment) to identify which of the thirty-two registers of the file has been selected, and another bit to indicate whether thirty-two bits or sixty-four bits are to be employed. The address information also provides a virtual address to which the data is to be transferred and stored in main memory. The entire data word, including address data, is directed over the crossbar connection to the store register file. Typically, the "crossbar connection" is an I/F bus and/or a floating point load bus.

As noted above, the integer load and floating point load buses further provide inter-cluster communication. Thus one integer processor can transfer data to another integer unit over the integer load buses and similarly, one floating point processor can transfer data to another floating point processor over the floating point load buses. In addition, the global controller accesses memory through the floating point buses, in the illustrated embodiment of the invention, and further uses those buses to communicate with the floating point processors (a) when the floating point divider 92 is being used and (b) to pass program counter (PC) data to both processors (the integer processor via the I/F buses). Further, when there is a cache miss as described below, the global controller uses the floating point load buses to obtain so-called mask words.

As noted above, the input/output processors can effect a direct memory access transfer. When permission for such a transfer is provided by the system control, the input/output processor addresses memory through physical address bus 0 (PA0) and the request appears at port 0 of the memory controllers. In the illustrated embodiment, the direct memory access is performed in sixty-four bit blocks in the illustrated embodiment. This is a limitation based upon the on-board memory at the input/output processor and the transfer can be performed in larger or smaller blocks depending upon the size of that on-board memory. Data is loaded into a DMA buffer of the requesting input/output processor through the integer load buses using two buses per beat of the system. The integer load bus pairs used for this process shift in successive beats. Since the integer load buses are bidirectional, the input/output processors can also write to memory in sixty-four bit blocks using pairs of the integer load buses. During the direct memory access transfer, the integer load buses are prevented or blocked from use by any cluster to prevent interference with data transfer. This condition of data flow to or from memory is termed "block mode" data transfer.

Bus Priority and Arbitration

While the compiler has the details of both the bus architecture and its operation, it nevertheless cannot predict the complete data flow requirements of the apparatus during execution of the program material. The compiler thus does not assign each individual bus for specific use during each instruction cycle, although the compiler does ensure that sufficient bus structure is available to handle the maximum flow of data during a machine cycle. Thus the assignment of tasks divides between the compiler and a priority and arbitration system which the apparatus employs for controlling the assignment of buses to various functions.

Accordingly, in view of the large number of buses available to the system, an orderly method of controlling data flow must be provided during instruction execution. The hardware characteristics dictate these limitations or restrictions; and, since the compiler knows the system architecture and the restrictions inherent therein, it should not, according to the illustrated embodiment of the invention, produce code which causes either detected or undetected execution errors due to violation of the operational restrictions. This is especially important in the illustrated embodiment where there is no mechanism, in certain instances, for stopping the execution of a program when a violation occurs. The program continues and the data is either lost or altered. This could occur, for example, if two sources try to send data simultaneously over the same bus. Accordingly, a priority system associated with the buses and the sources connected to the buses, provides that some requests will be honored and other requests rejected. However, in some instances it can happen that sources which are rejected never send the data which they were supposed to send. In the illustrated embodiment, this error is not flagged and the program then provides the wrong results.

While the controller avoids, by a "knowledge" of the structure and availability of the hardware configuration, the situation in which data is lost, it does not and cannot predict with certainty the data flow sources and destinations and the specific buses required at each machine cycle. Thus, while errors due to the simultaneous requirements of two sources can be avoided because of inadequate bus availability, the apparatus, through the compiler, does not dictate which buses will be employed at a particular machine cycle. This is, as noted above, provided dynamically through a prioritization of the buses and hardware.

The prioritization system, much like a dynamic arbitration between buses, is different for different buses. With respect to the integer load and floating point load buses, in order to prevent the loss of time as well as, possibly, data, in the event there is an error in accessing either the buses or memory, there is provided a dynamically operating load bus arbitration method which examines which integer load and floating point load buses respectively are to be used in a given beat. The bus arbitration circuitry routes local data flow, for example data moving from an integer processor register file register four to register eight in the same file and which local movement may require use of an integer load bus. Such intra-processor movement is directed or delayed, as noted below, to buses that are free, thereby preventing fatal bus contention, otherwise known as "tri-state clash."

There is thus provided a simple arbitration method for intraprocessor unit data transfers based upon an arbitrary priority assignment to make use, as necessary, of available buses. Each cluster 12, 14, 16, and 18 is assigned a priority level, the highest priority belonging, for example, to cluster 18 and the lowest priority belonging, for example, to cluster 12. (In those beats during which the global controller is active, with respect to the floating point load buses, it has the lowest priority level.) Each processor has associated with it a two bit field. This two bit field represents the state of bus usage by the processor. The field can be, for example:

11 = no buses being used;
10 = ALU0 using a bus for local register file write;
01 = ALU1 using a bus for local register file write; and
00 = both ALU's using buses for local register file writes where "local" relates to writes within the register file associated with the integer or floating point processor.

If the ALU's are considered in this manner, the integer and floating point processors can each be thought of as each having six incoming request lines: four from the memory controllers (the integer and floating point buses, respectively), and two local request lines (the I/F buses).

In operation, the cluster, having thus been assigned a highest priority, even though arbitrary in accordance with the illustrated embodiment of the invention, sends its bus "usage" codes, for each processor, to all of the other clusters through connections on the machine's backplane. Each lower priority cluster sends copies of its own usage codes only to those clusters having a yet lower priority. Thus, the integer processor of a cluster is advised only of those integer load buses which are being used by integer processors of higher priority. Each integer processor then has the information necessary to reject any requests for use of these buses during the next beat of the equipment. This is of particular importance since the memory "grab bus" signal is registered in a processor one beat prior to an actual memory transfer. An integer processor can, however, grab any integer load bus that is free in order to handle its own local register data flow, and can "bump" an integer processor having a lower priority from use of the buses. In accordance with the convention adopted for this equipment, the integer processor selects that available integer load bus having the lowest identification tag number. Thus, if the usage code is "00," and two buses are needed, by convention the data associated with the lower arithmetic logic unit (ALU0) always connects to the lower numbered available bus. The F-unit backplane arbitration system works in the same manner except that there is in effect one additional processor, that is, the global controller which, as noted above, has lowest priority of all.

The existence of a memory "grab bus" signal effectively prevents use of the associated bus for two beats of the equipment. That is, the associated bus is enabled for two beats after it is grabbed so that data has sufficient time to flow to the selected destination register. There are, however, three special circumstances in which all of the load buses are blocked from any other use, except those required to complete the special operation. One of these has been noted above as the DMA block read in which the input/output processor requests, at port 0 of the memory controllers, control of the buses. In this condition, all buses are blocked even though the memory controllers, in the illustrated embodiment, will be active on only a limited fixed number of buses (less than all the buses). The second circumstance, which is in essence a special case of the first, is the implementation of a cache miss sequence to refill the distributed instruction cache. When an instruction cache is refilled, the global controller uses the block mode read sequence and blocks use of all buses for any other purpose. The third special instance is the memory refresh condition during which time memory cannot be accessed by any of the memory controllers. Accordingly, to prevent any attempt at memory request processing, all load buses are blocked during the dynamic RAM refresh cycle.

A different sequence of operations takes place when the equipment hardware stores data in memories 42, . . ., 56 or when data transfers from one processor of a cluster to the other. In accordance with the illustrated embodiment of the invention, a crossbar structure enables any integer processor to connect and communicate with any floating point processor in order to send a word of data to any register of the store register file 104 associated with the connected floating point processor. The cross bar implementation is effected using the I/F buses and the floating point load buses. Circuitry in the floating point processor implements these connections in a multiplexor fashion. The data in a register of the store register file 104 can be stored in any of memories 42, . . . ,56 using the four store buses 116. A defined priority system, different for the I/F and store buses, allocates the buses so that data is not lost. Since data can be made available to the I/F buses from a large number of sources, the I/F buses use a more complex arbitration procedure than described above for intra-processor data transfer for determining which data shall be placed on a bus when more than one source has requested the bus. Further, the length of the data placed on the I/F buses is typically quite variable.

The I/F buses that interconnect the integer and floating point processor units of a cluster can receive data requests, in the illustrated embodiment, from six sources at the integer processor. The six sources include the four integer load buses (each of which can have a forward bit set in its register file tag data indicating that data is to be transferred to the floating point processor register file) and the integer arithmetic logic units 70 and 72 (for example for storage in the floating point register file.)

The floating point processor, however, generally has priority for use of the I/F buses. If both the floating point processor and the integer processor of a cluster need to use the I/F buses during the same beat of the equipment, the integer processor must defer its request except in the case of an instruction cache miss. When an instruction cache miss occurs, it is crucial that the integer processor have priority of use of the I/F buses so that it can forward new valid instructions from memory to the floating point processor instruction cache, thereby replacing the invalid instructions then stored there.

The floating point processor, using its priority position, selects, using a multiplexor, seven bits of integer destination tag information from one of its two local sources, the registers in the adder and multiplier, and applies that data to the I/F bus. The floating point multiplier has priority over the floating point adder, meaning, in case of conflict, that the multiplier will send its tag bits over I/F bus zero, "bumping" the adder to I/F bus one. Six bits of tag data identify the destination bank and number of the register in the integer processor register file, to which the data is to be directed. The seventh bit of the tag data is set if the tag being sent is associated with a valid data word.

The floating point processor uses its priority position to control the direction over which the I/F buses will transmit data. Even if the integer processor has data to be sent over the I/F buses, it is nevertheless the floating point processor which enables the I/F buses to provide for the transmission of the data. The floating point processor generates a signal which turns the floating point ALU's off to enable either of the I/F buses to transmit data from the integer processor to the floating point processor.

Each cluster, in the illustrated embodiment, attempts to use that storage bus having the same number as the memory (modulo the number of store buses) that will write the data. If there is a storage bus contention, that is if two floating point units attempt to use the same storage bus in the same beat, a program execution error will result. The processor with the lower identification number sends data from its storage register file into memory; however, the other processor's data will never be written. This error, in the illustrated embodiment of the invention, does not cause a trap or signal any warning messages. Since the compiler knows, however, that only thirty-two bits of data can flow over a storage bus in a single beat or clock of the apparatus, it should never schedule more than one storage operation for a bus at one time. Thus, in practice, an error does not occur in a working system. For sixty-four bit stores, which can only be issued from clusters 0 and 1 in the illustrated embodiment of the invention, two adjacent storage buses are used, the lower numbered one having the same number (modulo the number of buses) as the memory storing the lower thirty-two bit portion of the sixty-four bit store.

ECC and Bank Stalls

In accordance with the illustrated embodiment of the invention, there are several circumstances under which the clusters 12, 14, 16, and 18 must suspend execution of a program for a period on the order of a few beats. The condition under which a clusters' clock temporarily halts is referred to as a "stall." A memory controller can cause the CPU and other memory controllers to stall through a "bank stall" or an "error correction code (ECC) stall." The bank stall, referred to above in connection with the memory bank disambiguator, results from an attempt to read from or write to the same memory bank more than once in four beats. The number of pipeline stages can vary depending upon whether a read or a write instruction is initiated, but in either case, if an error occurs, pipelines must either drain or be allowed to continue through to completion. The error correction code stall occurs when a memory controller detects a parity error during a memory load operation. The detection of the parity error causes the memory controller to send a signal to the clusters, stopping the cluster clocks, and providing the memory controller with sufficient time to correct the data causing the parity error.

Bank stalls vary in length depending upon how far apart, in beats, the requests to the same memory bank arrive at the memory controller. The underlying bottleneck, as noted above, is a four beat latency in dynamic RAM access. In the illustrated embodiment, where the access time is 240 nanoseconds because the equipment has a machine cycle time of 60 nanoseconds, a clock output to the equipment, a beat, occurs each sixty nanoseconds. Thus, if a memory bank receives requests in two successive beats, it will stall the machine for three beats, thereby providing time for the initial request to enter and be acted upon by the dynamic RAM. When the requests are further apart in time, less stall time is required.

When the CPU is stalled, it cannot receive data over the load buses. Nevertheless, the memory pipelines of the operating memory controller(s) continue to provide data and that data is held temporarily in a first in, first out (FIFO) register, at the controller, so that it will not be placed on a bus and thereby be lost irretrievably. Thus, the FIFO register provides temporary storage for data previously requested. A two bit FIFO select register acts as a pointer into the FIFO register so that when data can be again placed on the buses, the previously stored FIFO register data is correctly retrieved.

An ECC stall temporarily stops the machine for several beats while the memory pipeline of the memory controller that detected the parity error drains or completes operations with respect to valid data therein. The parity error, in the illustrated embodiment, is registered after the data has already been transferred over the selected floating point or integer bus. However, the error detection mechanism works in parallel with the data path delivery operation. (Data is sent from the memory array storage flip flops to another set of latches and then onto the enabled bus.) Accordingly, the stall signal reaches the cluster from the backplane just prior to the time at which data, to be used by the processing unit, is latched. Thus, the "bad" data is never used for cluster operations and a corrected version arrives several beats later at the correct processor. The memory controller keeps a copy of the bus number over which the "bad" data was sent so that new data can be sent over that same bus to the correct processor. If the machine is bank stalled when an ECC error is detected, the bank stall must clear before the ECC pipeline can drain. Finally, whenever a memory controller is operating in the block mode for direct memory access, the ECC check process is eliminated since there cannot be an ECC stall in the block mode. Moreover, bank stalls are also not possible during a block mode transfer.

Instruction Storage and Cache Miss Architecture

According to the illustrated embodiment of the invention, the system includes a distributed instruction cache which stores approximately 8,000 instructions (twelve bit addressing), each instruction being a 1,024-bit very long instruction word (VLIW). In the preferred embodiment of the invention, each 1,024-bit instruction has four cluster groupings, one grouping for each of the four clusters, and each grouping has eight 32-bit fields. Further, in this illustrated embodiment, the apparatus associates with each cluster grouping, during execution of the instruction, two machine "beats," an early beat and a late beat. However, not all fields of the grouping are associated with one or the other of the beats. The eight 32-bit fields correspond, in sequence, to an early ALU0 operation, a so-called early immediate data field stored on the integer processor and which may represent for example a constant data value to be used by an ALU operation, an early ALU1 operation, a floating point adder operation, a late ALU0 operation, a late immediate data field stored on the integer processor, a late ALU1 operation, and a floating point multiplier operation. The floating point operations are not effective for two beats of the apparatus. Typically the floating point instructions take more than one machine cycle to complete.

As the compiler generates the necessary instruction code, thus in essence filling the fields of an instruction word, it often occurs that one or more of the thirty-two bit fields will contain all zeros, which represent NOP fields. Accordingly, the memory which stores the instruction words can have a substantial number of zeroed spaces. In view of the large size of the instruction word and the desire to store as much in main memory as possible, thereby avoiding the necessity of referring back to a slower memory for instruction data, the apparatus provides for an advantageous method for storing the instruction words in a compressed format.

According to the preferred embodiment, the apparatus associates with each group of thirty-two fields, a so-called "mask word." Each bit of the mask word is associated with one of the thirty-two fields of the instruction word. For each zeroed field (or NOP operation), the corresponding bit of the mask word is zeroed, while for each operation or data constant other than all zeroes or a NOP, the corresponding bit of the mask word is set to one.

Figure 5:
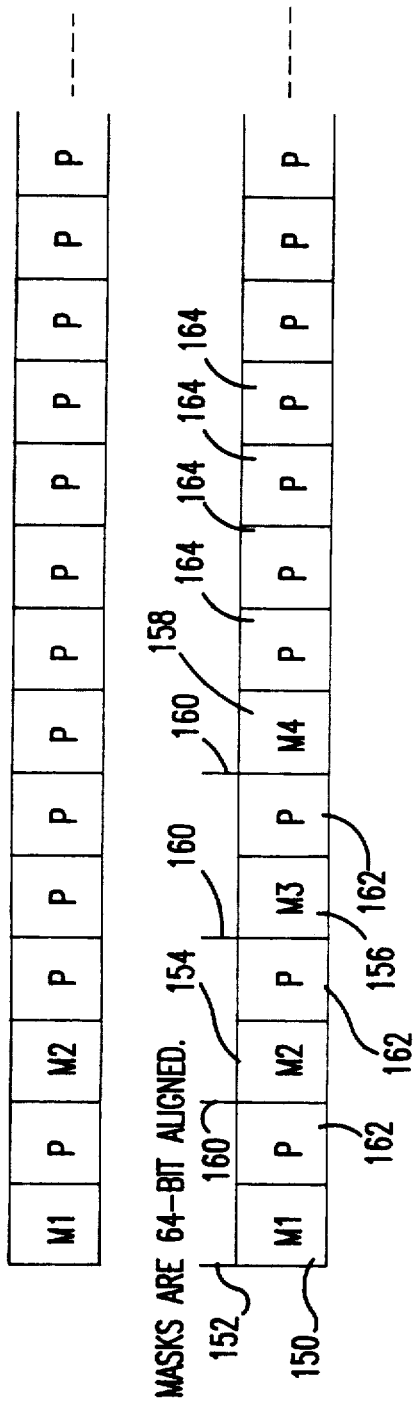
FIG. 5 is a representation of the method for storing mask word data in a four-wide system configuration.

The instruction words are then stored in memory in accordance with the format illustrated in FIG. 5. Referring to FIG. 5, and in accordance with the illustrated embodiment, instructions are stored in memory in groups of four, that is, four 1,024-bit instructions are stored together. For reasons which will become clear hereinafter, the format for storing the program instructions and mask words, in the illustrated embodiment of the invention, provides that the first word 150 in storage is a mask word and is aligned on a 128-bit memory boundary 152. Each succeeding mask word 154, 156, 158 associated with the four instructions is aligned on a sixty-four bit memory boundary 160 and the word spaces 162 therebetween as well as the word positions 164 thereafter are filled with non-zero data. Accordingly, for the four instruction word storage illustrated in FIG. 5, the first seven words contain four mask words separated from each other by instruction data and the words following the last mask word contain the remaining non-zero fields for that four instruction grouping. The zeroed fields are not stored and the mask words are employed, as described below, to reconstruct the full 1,024-bit instruction words.

Figure 6:
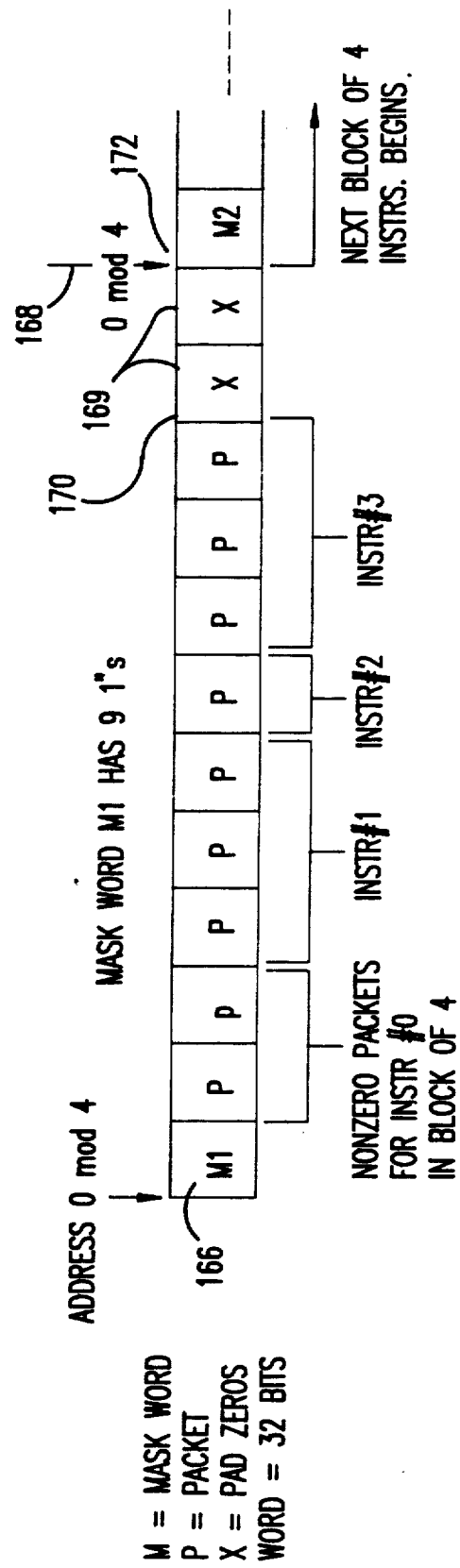
FIG. 6 is a representation of the storage of mask word and data fields in a one-wide, system configuration.

In other embodiments of the invention, wherein fewer than four clusters are simultaneously provided, the format can be similar. For example, where one cluster is employed, a single mask word will provide the details of four instruction words. Accordingly, referring to FIG. 6, the single thirty-two bit mask word 166 is followed by the non-zero fields for four 256-bit instruction words; and the next mask word is aligned on a 128-bit boundary 168. In this instance, the memory 169 between the end 170 of one four instruction grouping and the beginning 172 of the next four instruction grouping is "padded" with zeroes.

When instruction data is read from the interleaved memory and stored in the instruction cache of the system, the instructions are expanded from their compacted storage format to their full width of, in the illustrated four processor wide system, 1,024 bits. As will be described in more detail hereinafter, when the instruction data is read from memory, the mask words are made available to the global controller over the FLOAD buses while the instruction data is provided, in a block mode, over the integer load buses.

As the instruction data is read from memory it is placed in the distributed system instruction cache. The apparatus, in the illustrated embodiment, places the integer ALU0 and ALU1 instructions and the immediate fields for both the early and late beats in a distributed instruction cache 176 of the integer processor and places the floating point multiplier and adder instructions in a distributed instruction cache 178 associated with the floating point processor. The apparatus further associates with each field or instruction loaded into the cluster instruction cache a global controller generated I-cache tag, ten bits in length in the illustrated embodiment. This tag, described in more detail below, denotes the location in which the instruction or field should be stored in cache. This tag data thus identifies with which one of the thirty-two possible fields the thirty-two bit data is associated for proper storage of the data in the cluster. In particular, the tag is associated with the integer load bus carrying the associated data and identifies valid data (a non-zero tag) or invalid data (a zeroed tag).

Cache Miss Engine

During program execution, the cluster first attempts to read a required instruction from its "on board" cache memory. When an instruction required by the cluster is not in the cache memory, a cache miss results and the apparatus then retrieves the instruction from main memory, refilling distributed instruction cache memory at a high instruction rate. This method of instruction retrieval is designated the block mode of operation. The apparatus employs a so-called cache miss engine to implement the instruction cache refill process.

In addition to storing actual instruction data in a distributed instruction cache associated with the integer and floating point processors, the apparatus further stores data at corresponding addresses in cache memory on the global controller. This data relates to the virtual address associated with the instruction and the location in memory of the next value of the program counter. Thus, in addition to generating the I-cache tag data for each instruction, the global controller further generates, for storage in a virtual address tag RAM, virtual address tag data identifying the upper nineteen bits of the virtual address associated with the instruction. (The lower fourteen bits of the virtual address are used as the address at which the instruction will be stored in the cache memories.) This corresponds as well to the lower fourteen bits of the memory address. As will be described in more detail hereinafter, the apparatus, when it reads an instruction from cache memory, compares the virtual address tag stored in memory with the virtual address provided by the cluster to determine the validity of the cache instruction.

Since the instructions stored in virtual memory have a variable length, it is not possible to merely increment the program counter by a fixed quantity to determine the next instruction location, that is, the next program counter value. This sequence of program counter values is stored, as described below, in a portion of the instruction cache designated "next PC RAM." Thus, when an instruction is read from the cluster instruction cache, the next program counter value is designated by the data in the next PC RAM cache, at the same instruction cache address. The next PC value determines the location of the next instruction (absent an instruction branch or other transfer).

Should there be a cache miss, that is, if the instruction at the designated location in cache is not the correct instruction, the apparatus initiates the cache miss engine. A cache miss can occur because either the output of the virtual address tag RAM does not match the current PC address, or the present user identifier does not match the current user. The latter condition can occur when the apparatus is employed in connection with a plurality of processors or users. When plural processes are running, the apparatus stores in a process identifier (ASID) RAM, a cache memory located at the global controller, an eight bit designator identifying the process or user to which the instruction at the same address in the cluster instruction cache belongs. Thus, two different users can be switched in and out of the same cache memory locations and the global controller checks that the cache instruction belongs to the current process or user.

Figure 7:
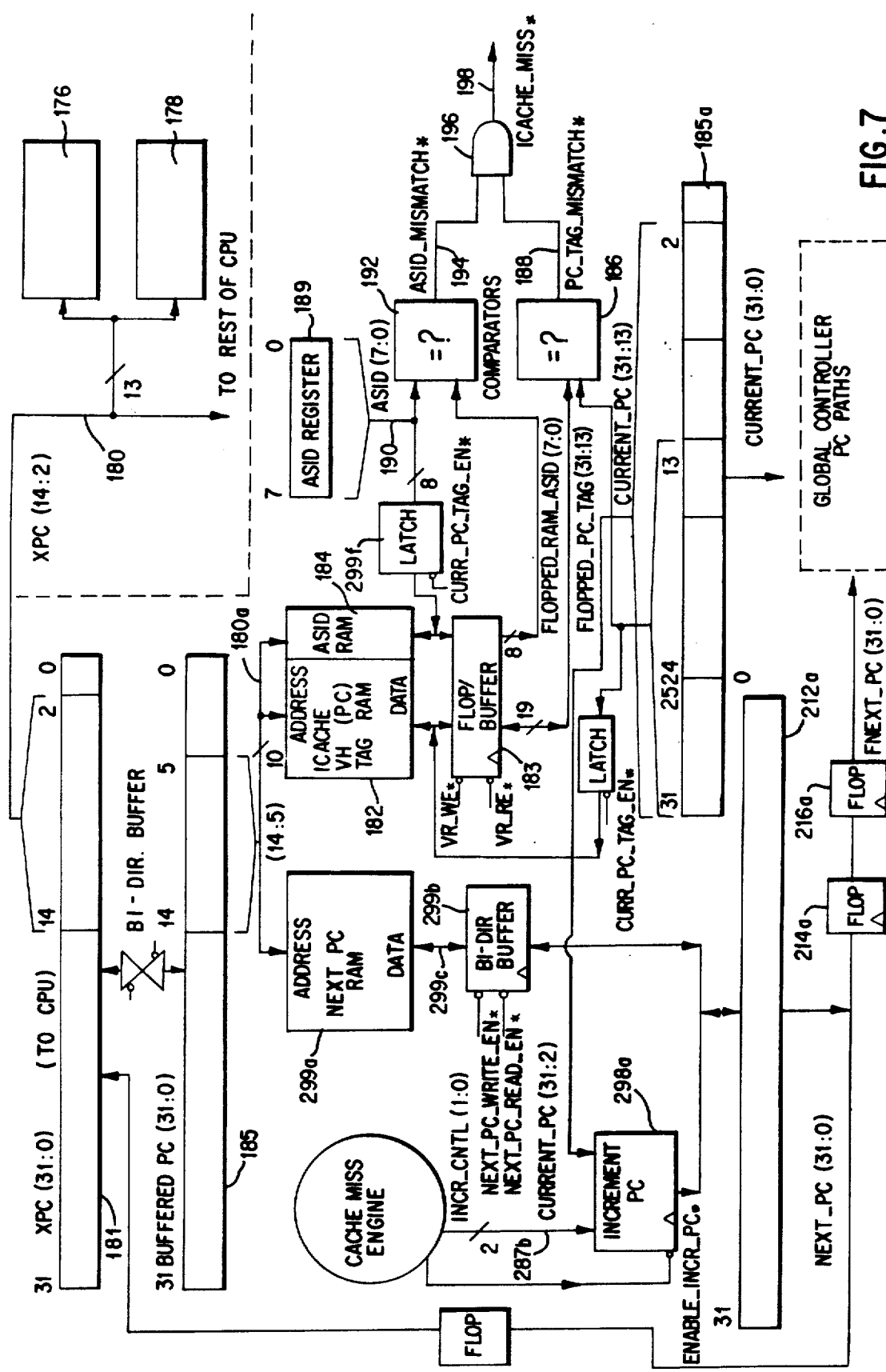
FIG. 7 is an electrical block diagram illustrating cache miss detection and addressing, and calculation and storage of the next program counter value according to a preferred embodiment of the invention.

Thus, referring to FIG. 7, the stored program counter output address data is provided as an address over lines 180 to the distributed cluster instruction cache memories 176 and 178 (FIGS. 3 and 4) through an XPC register 181, and over lines 180a to a virtual address tag RAM cache 182 and a process identifier RAM cache 184 through buffered PC register 185. The stored tag output of the virtual address tag RAM 182, a nineteen bit value corresponding to bits 13-31 of the current PC value, pass through a buffer 183 and are compared bit for bit in a comparator 186 with the current PC tag available from register 185. For convenience of illustration, a duplicate of register 185 is illustrated as register 185a. The output of the comparator over a line 188 indicates whether or not there is a complete match. Similarly, the eight bit output of the process identifier RAM 184 is compared to the current user or process identifier from a register 189 over a line 190, on a bit for bit basis, by a comparator 192. The output of this comparison procedure over a line 194 is OR'd, in an OR gate 196, with the output of comparator 186 and provides a cache miss output over a line 198. The presence of a cache miss over line 198 initiates the cache miss refill process.

When a cache miss is detected, the global controller first zeroes the effected cache memory locations, that is, all the data at the cache addresses to be replaced, and then initiates the cache refill process. The global controller initiates the memory read cycle, assuming that the instruction is in memories 42, . . . ,56. If the instruction is not in memory, as determined below, it must be retrieved first from a yet slower memory such as disk and stored in the memory banks controlled by the memory controllers.

Referring to FIG. 7A, the global controller 40 assumes, as noted above, that the instruction to be retrieved and stored in the instruction cache can be found in memories 42, . . . , 56. The current PC value, stored in a register 185a, provides a virtual address which is converted, using an instruction TLB 202a and logic circuitry 203a into a physical data address available at the output of a buffer storage 204a over lines 206a. This value is illustrated as stored in a register 208a.

The validity of the instruction TLB output is tested in the same manner described above in connection with the output of the instruction cache. That is, bits 16-23 of the physical data address are compared by a comparison circuitry 222a with the current value of the user identification stored in register 189 and available over lines 190. Similarly, the high order bits of the address, bits 25-31, are compared using a comparison circuitry 224a against the corresponding high order bits available from the previous program counter value over lines 210a from the NEXT PC register 212a (FIG. 7) through two stages of delay represented by buffer registers 214a and 216a. The output of the instruction TLB available over lines 206a is also checked for correct parity using a parity generator 218a and a comparison circuitry 220a. Comparators 220a, 222a, and 224a compare their respective inputs on a bit-by-bit basis. If any of the corresponding bits input to comparators 220a, 222a, and 224a do not match, the output of an AND gate 226a over line 240a signals an instruction TLB miss requiring the global controller to swap pages between, for example, disk memory and memories 42, . . . , 56.

The lower sixteen bits of the output of the instruction TLB are directed to a word-in-bank shifter 222b which combines these bits with bits 8-12 from the previous "FNEXT PC VALUE" to generate a word address over lines 226b. The word-in-bank shifter is responsive to the memory configuration data identifying the number of banks per controller, a value available over lines 228a, to generate the word-in-bank value which is made available to the physical address lines through a buffer 230a. Simultaneously, bits 3-10 of the NEXT PC register 212a provide an identification of the controller and bank number. These bits are input to a circuitry 232a which, also responsive to the memory configuration data, provides the data for identifying the memory controller number and bank number respectively of this configuration. This data is passed through a buffer 234a. The outputs of buffers 232a and 234a define the address of the next word to be read from memories 42, . . . 56 and are provided by the global controller over the physical address bus lines 118.

Figure 8:
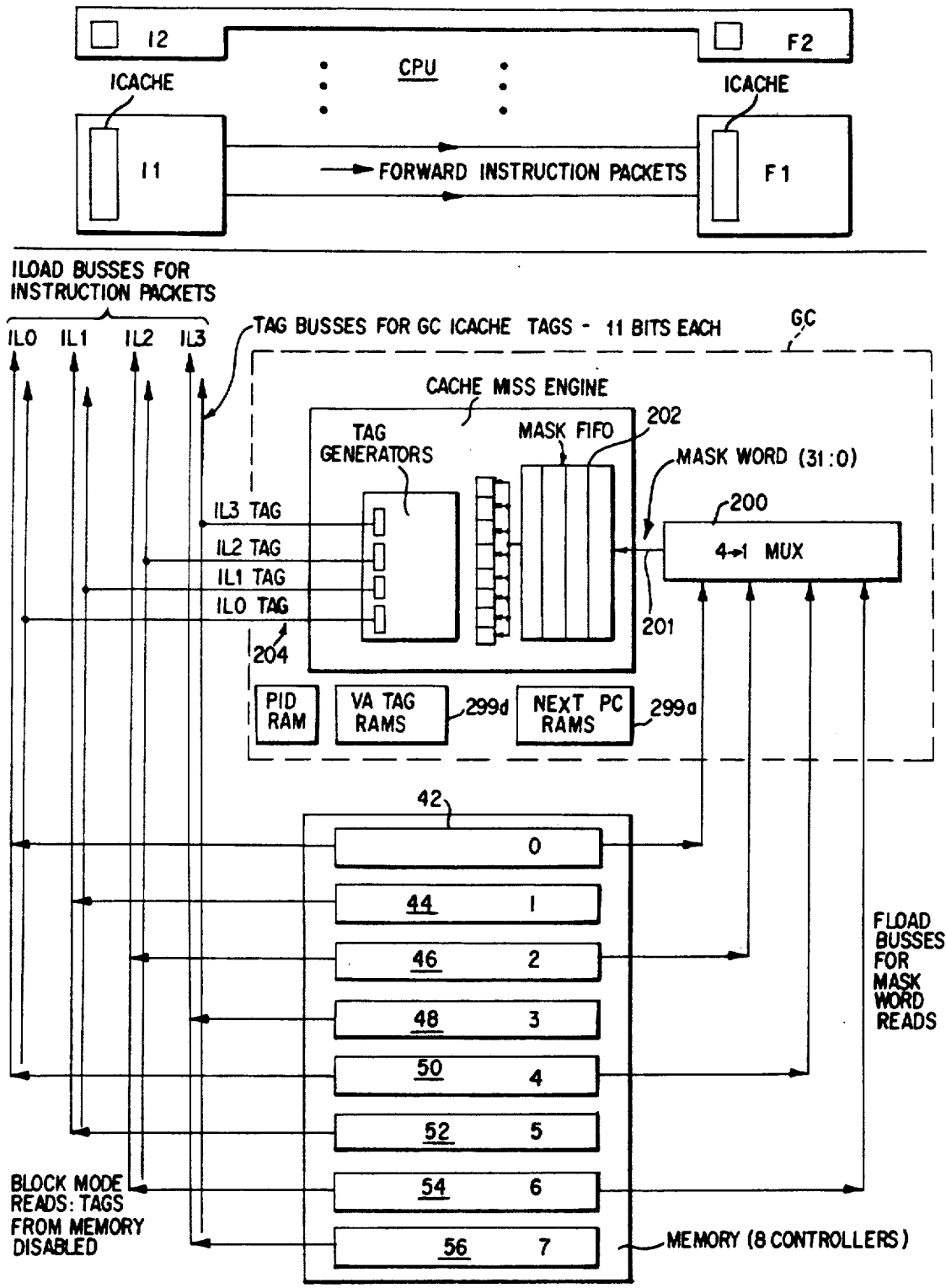
FIG. 8 is an electrical block diagram illustrating elements of the cache miss engine in accordance with a preferred embodiment of the invention.

Referring now to FIG. 8, the cache miss refill process provides for reading the mask words from memories 42, . . . ,56 over the floating point load buses to a four to one 32-bit wide multiplexor 200 in the global controller 40. The address to be read is supplied by the current PC value from the global controller over the physical address bus 118. The output of the multiplexor over lines 201 is stored in a first in, first out, four deep, thirty-two bit wide buffer memory 202. The mask words are processed by the global controller for producing I-cache tag data for association with each of the integer load buses. This is the destination identification tag data for each of the instruction data fields which will have been read from memory placed on the integer load buses. At the same time that the mask word data is being provided to the global controller by up to four memory controllers (note FIG. 5), the remaining memory controllers can concurrently provide the instruction data fields over the integer load buses. The instruction data fields, each being thirty-two bits wide, will thus each have associated therewith the I-cache tag data which has been placed on the tag buses 204 at precisely the same time that the instruction data fields are placed on the integer load buses. In this manner, the instruction data fields are continuously read from memory. In the illustrated embodiment, even though the cache miss reflects that only one instruction word is incorrect in cache, the apparatus transfers a complete four VLIW instruction block, at high speed, to the cluster instruction cache for storage. Simultaneously, of course, the global controller also updates the virtual address tag RAM, the next PC RAM, and the PID RAM.

As noted above, the mask words are then read from memory over the floating point load buses and are directed to a first in, first out memory (FIFO) which provides sufficient storage, in the illustrated embodiment, for four thirty-two bit mask words. This corresponds, for a four-wide CPU configuration, to four instruction words in a four VLIW block read.

Figure 9:
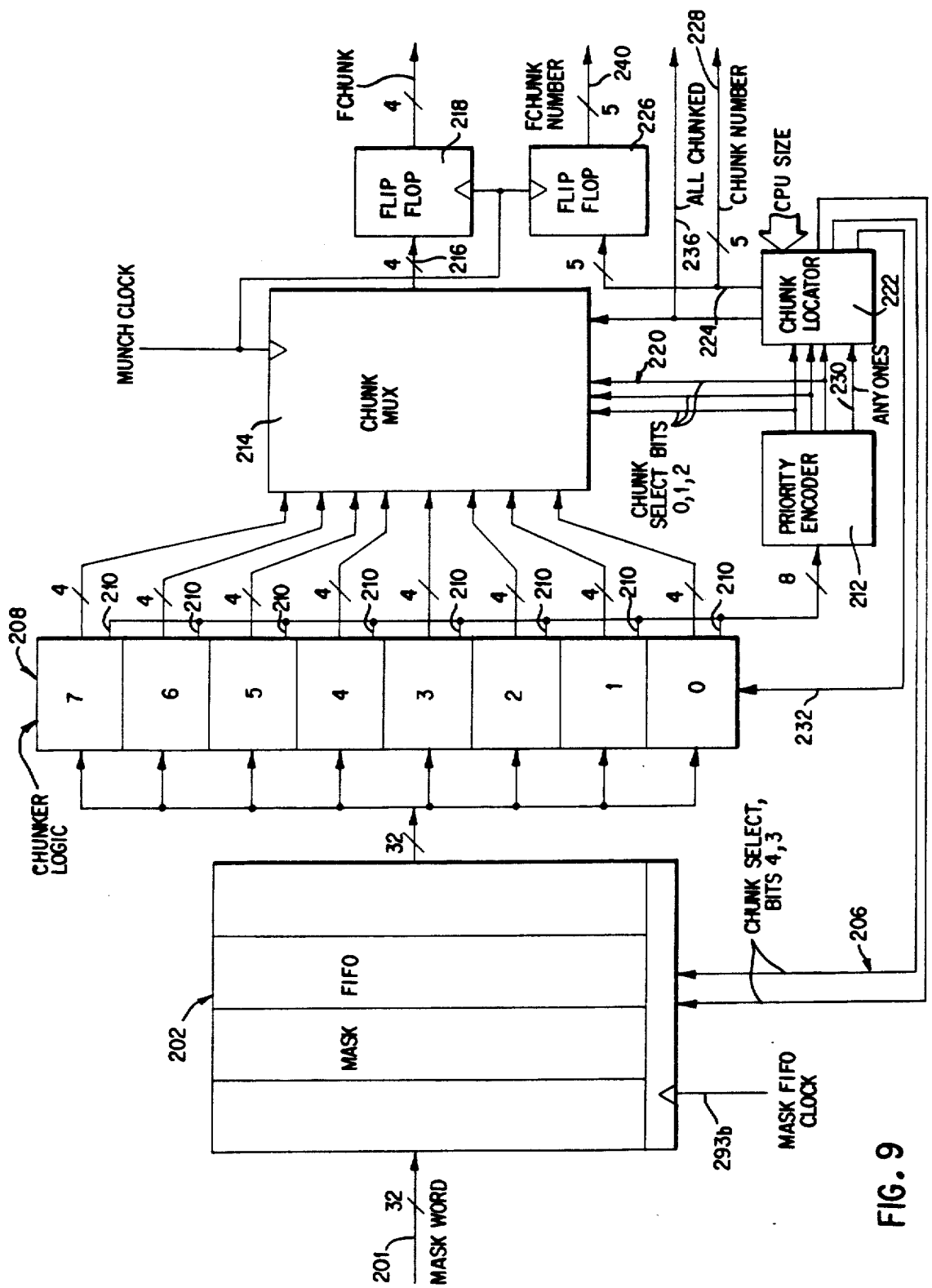
FIG. 9 is an electrical block diagram of a first section of a cache miss engine.

Referring to FIG. 9, the first instruction word mask ((aligned on a 128-bit (4-word) boundary in memory)) is identified by the "chunk" select lines 206 and is loaded into and stored by a plurality of four bit registers 208 identified as "chunker" logic registers zero through seven. Each chunker logic register outputs the stored four bit input and a "ones" line 210 indicating whether any of the output bits equals "one." A "one," it will be recalled, indicates the presence of a non-zero data field.

A priority encoder circuitry 212 receives each of the data indicating "ones" lines 210 and, starting with the four bits of the mask word associated with the early beat of cluster 26, and continuing from early beat to late beat and from cluster 26 through cluster 20, controls over lines 220 a "chunk" multiplexor 214 for sequentially selecting each four bit "chunk," having nonzero data, and outputting it over lines 216 to a storage register 218. The priority encoder output select bits over lines 220 are further sent to a chunk locator circuitry 222 which designates which four bit group of the four mask words being processed (for a four cluster architecture) is being stored in register 218 and provides that identification as a five bit output number over lines 224 for storage in registers 226 and for transmission over lines 228. The chunk locator sets the mask FIFO select data over lines 206 which selects the mask data in a buffer 202 to be made available to logic 208. In this connection, locator 222 receives a signal over lines 230 from the priority encoder when the "ones" associated with all of the data in the chunker logic registers has been processed. The chunk locator further provides a signal over lines 232 to the chunker logic registers 208 indicating that a present four bit group has been processed. In response thereto, the data indicating line from that present four bit group is reset.

Once all of the four bit groups in the chunker logic registers have been processed, as indicated by the signal over line 230 from the priority encoder, the chunk locator circuitry provides an "all chunked" or completion signal over a line 236 and increments the mask select logic signals to the next mask in the FIFO storage. It is helpful to recognize that the chunk select bits correspond, in the illustrated embodiment to the two high order bits of the chunk number.

Figure 10:
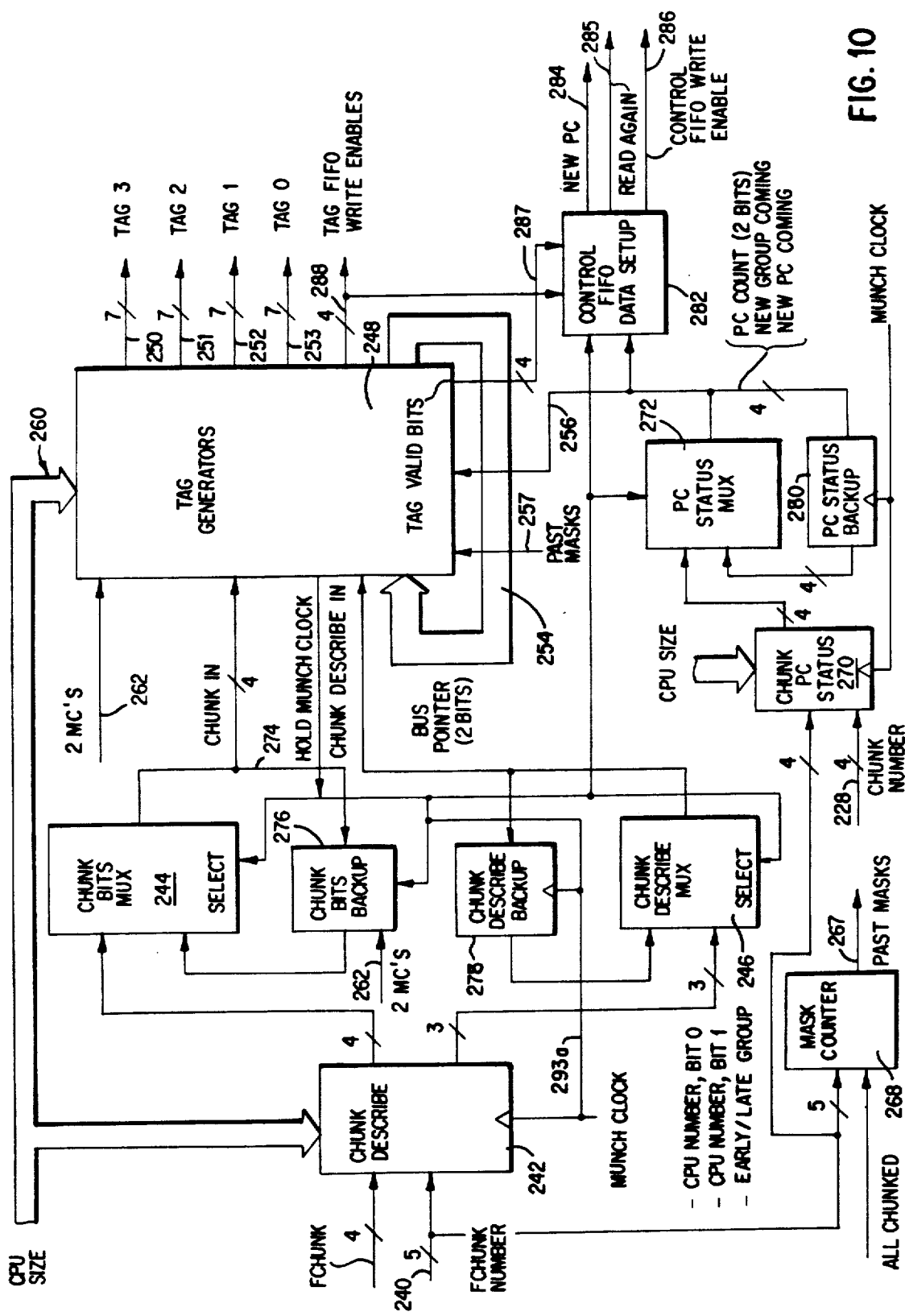
FIG. 10 is an electrical block diagram illustrating the beginning of tag generation in the cache miss engine according to a preferred embodiment of the invention.

Referring now to FIG. 10, the four bit output of register 226 and its associated chunk number over lines 240, are stored in a chunk description circuitry 242. The chunk description circuitry provides the four bit input data chunk to a two-to-one multiplexor 244 and the upper three bits of the chunk number, corresponding to the cluster number (two bits) and its designation of an early or a late group, are directed to the chunk description multiplexor 246. The outputs of the multiplexors are directed to a tag generation circuitry 248 which receives the three bit chunk description and the four bit chunk grouping and outputs up to four destination tags over lines 250, 251, 252, 253. Other inputs to the tag generation circuitry 248 include a two bit notation over lines 254 pointing at the integer bus with which the next generated tag is to be associated, and a four bit input over lines 256 including the number of counts to be added to the program counter, a single bit indication if the input represents a new four bit chunk, and a single bit to indicate if a new program counter value is to be associated with the present four bit chunk. The tag generation circuitry also receives a past mask signal over line 257 from a mask counter 258, data describing the CPU configuration over line 260, and data indicating if there are only two memories over lines 262. The output of the tag generators over lines 250, 251, 252, 253 each represents a seven bit designation of the destination of a particular associated instruction over a corresponding, respective integer load line. These tags are stored in respective tag FIFO registers 257, 258, 259, 260 for use as will be described hereinafter.

The stored chunk number is also passed to a mask counter 268 over lines 240 and to a chunk program counter status logic 270. The status logic also receives the present chunk number over lines 228 designating the chunk presently being processed. The chunk PC status circuitry provides a two bit program count increment, designating the value by which the program counter value should be incremented to accommodate the new chunk being processed, as well as one bit indications that the chunk belongs to a new group (new early or late group) and whether there is a new PC coming. These values are stored in a program counter status multiplexor 272.

Under certain circumstances, and in particular when there are only two memory controllers, it is impossible to process in a single beat a grouping or chunk in which there are three or more ones corresponding to three or more fields to be stored in cache. In this circumstance, a signal indicating the smaller number of memory controllers is available to the tag generator circuitry over line 262 and in response, the tag generator circuitry provides a hold munch clock signal over lines 274. The hold signal over lines 274 prevents further processing (munching) of the four bit groupings, and also selects the alternate input in the chunk bit multiplexor 244, the chunk describe multiplexor 246, and the PC status multiplexor 272. The alternate input is the previous input to these circuitries as was stored in backup registers 276, 278, 280 respectively, that is, the same chunk is used again.

The tag generation circuitry also receives data over lines 260 describing the size of the CPU configuration which defines the number of integer load buses in the illustrated embodiment and also the maximum number of tags which can be generated each cycle. The apparatus also has a control FIFO data setup circuitry 282 which provides a new program counter signal over line 284, a signal indicating a further read of the same chunk over line 285, and a control FIFO write enable signal over line 286 for use by circuitry described in connection with FIG. 11. The setup circuitry 282 operates in response to the new PC signal from the PC status multiplexor, the signals indicating which tag lines contain valid data (over lines 287), and the tag FIFO write enable signals over lines 288.

Figure 11:
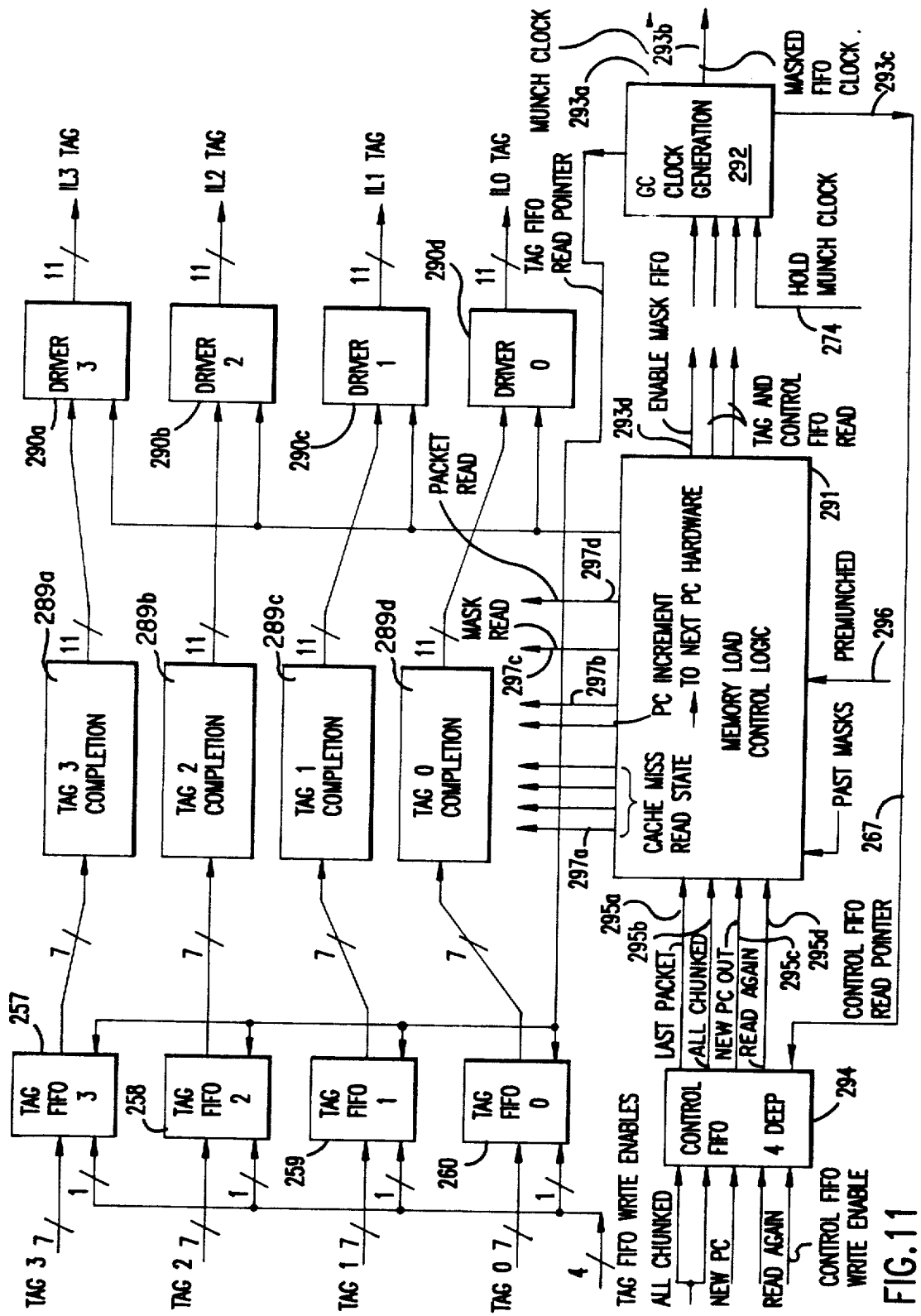
FIG. 11 is an electrical block diagram showing the completion of tag generation in the cache miss engine according to a preferred embodiment of the invention.

Referring now to FIG. 11, the tag data is stored in the respective tag FIFO registers 257, 258, 259, 260, and is read by respective tag completion circuitry 289a, 289b, 289c, and 289d which generates an eleven bit tag output. The eleven bit output corresponds, as illustrated in FIG. 11, to the seven tag input bits. The eleven bit outputs are directed to respective driver elements 290a, 290b, 290c, 290d which are enabled by a memory load logic control circuitry 291 at that time when the corresponding instruction fields are placed on the integer load buses.

The global control circuitry further provides for a global clock generation circuitry 292 for providing the munch clock over lines 293a, a mask FIFO clock over lines 293b, and a control FIFO read pointer over lines 293c. The clock generation circuitry operates in response to the memory load control logic signals over lines 293d, which include an enable mask FIFO signal and a tag and a control FIFO read signals. The munch clock signal output further inhibits the munch clock in response to the hold munch clock signal over line 274.

The global control circuitry further has a four register deep control FIFO 294 which receives data indicating a new PC, the read again signal over lines 285, the control FIFO write enable over lines 286, and a signal indicating that all of the chunks associated with this four instruction block of data have been processed over line 236. When all of the four bit groupings for the four instruction block have been processed, the control FIFO provides an all processed or all chunked signal over line 295b. In addition the control FIFO also provides, for each cycle, a last packet data signal over line 295a, a new program counter output signal over a line 295c, and a read again signal over line 295d.

The memory load control logic further receives the signals from the control FIFO, a signal indicating that the next mask word has been initially and partially processed, or "premunched," over a line 296, and a signal that all of the masks have been processed over lines 267. In response, the memory load control logic provides an indication of the cache miss read state over lines 297a, and the program counter increment signal over to the next program counter hardware over lines 297b. It further provides a mask read and a field or packet read over lines 297c and 297d respectively. The PC increment signal from the memory load control logic is directed to, referring to FIG. 7, an increment control circuitry 298a which also receives the current program counter value, bits 2-31. The circuitry 298a generates a next PC value and the lower fifteen bits of that next PC value are directed to a next PC address RAM 299a. PC address RAM 299a receives the PC data through a bidirectional buffer 299b over lines 299c. The next PC data value from circuitry 298a is generated during the cache miss operation as is well known in the art. Correspondingly, the virtual address tag RAM 182 and the ASID RAM 184 are loaded with the current PC tag from latch 299e and the current ASID value from latch 299f at the address designated by the lower fifteen bits of the program counter value in buffered PC register 185. This completes operation of the cache miss engine.

The Guess Miss

One limitation of the single set instruction cache is the manner in which it is addressed. The rigidity of the many to one mapping between main memory address and cache addresses can occasionally result in a thrashing behavior in which performance is dramatically lower than normal because of the execution pattern of repeated instruction cache misses. For example, a subroutine called from within an inner loop can cause thrashing if that subroutine was placed far enough away in the main program from the calling routine so that the cache addresses of the two routines overlap. Thus, at each call to the subroutine, the subroutine code is loaded, thereby displacing the calling routine; and at each return, the calling routine must be reloaded, displacing the subroutine.

Various methods have been devised to avoid such thrashing. For example, a "multi-set" cache, one in which multiple cache lines are implemented and checked simultaneously on each cache reference, can be built. Using the multi-set cache, there are N possible cache locations where a given word can be loaded; and, coupled with a corresponding refill algorithm, this approach can eliminate the pathological thrash and considerably improve worst case performance. The improvement, however, comes at considerable expense. Thus, nearly twice as much hardware is required for a two-set cache as for a one-set cache of equivalent capacity. And for constant capacity, the best case performance of a two-set cache is lower than that of a one-set cache; although, of course, the worst case performance is dramatically better.

In accordance with the present invention, the performance benefit of a two-set cache is provided with a negligible increase in hardware cost above that for a one-set cache. The method of the invention drops the highest bit of the one-set instruction cache address, that is, bit 15 of the program counter in this preferred embodiment, and substituting for that bit a so-called "guess bit." The use of the guess bit in effect allows the creation of two instruction cache sets, one with the guess bit set to "one" and the other with the guess bit set to a "zero." If an instruction cache miss occurs starting with one value of the guess bit, then, before starting a reload from memory, the global controller tries something much faster, that is, changing the value of the guess bit and attempting the instruction cache fetch again. If this cache also fails, then the instruction is loaded from main memory. This procedure has the effect of slightly lengthening the refill time if one is needed from main memory, and of slightly decreasing the "single-set" hit rate of the cache since it is now, in the illustrated embodiment, a 4K pseudo-two-way rather than an 8K one-way, memory. The procedure, however, markedly improves performance in the instance of a cache thrashing.

In accordance with the invention, when a cache miss occurs, and data must be loaded into the cache, the apparatus determines which set it goes in (that is, the value of the guess bit) by examining the two possible locations and determining which data therein is older, that is, which location was last written. The apparatus then stores the new instruction in place of the data which was oldest. Before writing the data, however, the apparatus also examines the value of the program counter corresponding to the previous instruction. The program counter according to the invention provides a forward guess bit (stored in the next PC RAM), that is, a "guess" at the value of the guess bit associated with the next instruction; and this value will typically be conformed to the location in which the new instruction data is being stored. Accordingly, the next time the previous instruction is executed, the next instruction in cache will be correctly addressed because the "forward bit" will direct the apparatus to the correct pseudo-set in cache.

The guess miss bit structure for reducing cache misses provides substantially advantageous improvements in thrashing performance at relatively small hardware and time costs. The apparatus does, however, incur some additional cost when branches are randomly taken. This is a relatively small price since instructions are stored in groups of four. Further, on a return from a subroutine, the apparatus does not use the forward guess bit but uses the bit of the return program counter address. Accordingly, the guess bit may then be improperly predicted. On the other hand, it is possible to save, in the lower two bits of the program counter, the value of the forward guess bit. This can advantageously improve, somewhat, the performance of the apparatus during a subroutine return.

TLB Misses

As noted above, a cache miss occurs when an instruction is not in the instruction cache register and must be retrieved from main memory. There are times, however, when the instruction is also not in main memory. In such an instance, there results the need to access a typically slower memory such as disk to retrieve the program instructions.

A similar situation exists with regard to data. In the illustrated embodiment, the integer processor is responsible for generating memory operation requests and the memory addresses for those requests. All memory addresses are directed over the physical address buses 118 to the memories 42, . . . ,56, and must be physical addresses. The operating system, however, uses a virtual memory management method to increase the total available address space. The total address space thus incorporates secondary storage devices such as disk and tape as well as the actual physical memories 42, . . . ,56. Further, the apparatus 10 does not employ data cache and thus all data memory access is, in the first instance, made of the physical memories 42, . . . ,56.

In the apparatus of FIG. 1, and referring to FIG. 3, ALU0, associated with each integer processor, is responsible for determining all memory addresses for memory load and store operations. This is accomplished, for example, by adding the thirty-two bit values provided by multiple sources. Since all memory addresses produced by the arithmetic logic unit are virtual memory addresses, a mechanism must be provided for translating the virtual address to a physical memory address for memory reference operations. That mechanism, associated with each integer processor, is the translation lookaside buffer or TLB 76.

The TLB 76, according to the illustrated embodiment of the invention, is a high speed cache random access memory which can store for example 4,096 (twelve bit address) thirty-two bit entries. Each entry corresponds to one page of memory, each page of memory corresponding to 8,192 bytes of physical memory.

Figure 12:
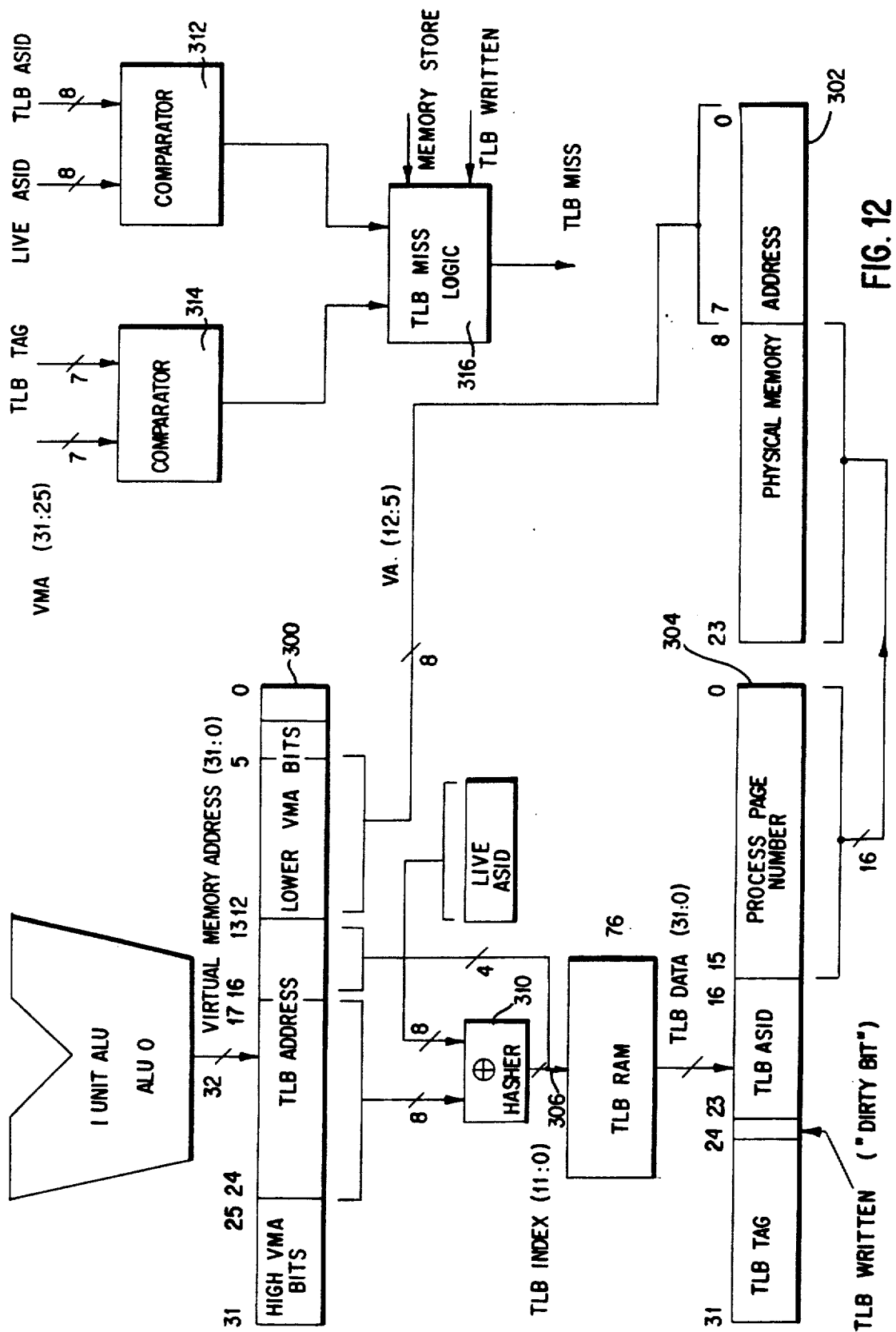
FIG. 12 is an electrical block diagram illustrating the virtual to physical address translation according to a preferred embodiment of the invention.

The format for converting a virtual address to a physical address is quite simple. Referring to FIG. 12, bits 5-12 of a virtual address 300 from ALU0 define, in the illustrated embodiment, the lower eight bits of a physical memory address 302. The upper sixteen bits of the physical memory address are set equal to the lower sixteen bits of the TLB RAM cache 76 output word 304. Bits 13-24 of the virtual memory address 300 define, as described below, an address input over lines 306 to the TLB RAM 76. The output 304 of the TLB RAM is a thirty-two bit number. A common problem in a multi-user virtual addressing system, such as that illustrated herein, is a high rate of TLB misses after each context, or process switch. A TLB miss occurs when the data at the address identified by the virtual memory address does not exist in the physical memory and must be retrieved from slower disk or tape memory. The high rate of TLB misses results from the fact that several processes often share the same TLB locations because of the traditional many-to-one mapping of virtual memory into physical memory. In such a situation, where the processes are changing quickly or frequently, a thrashing effect, analogous to cache thrashing in the instruction cache, can occur.

In accordance with the illustrated embodiment, the conversion of the virtual memory address to a physical memory address includes a hasher circuitry 310 to avoid thrashing in the data memory access path. To implement this advantageous improvement, the apparatus associates a user identification designation with each TLB entry address, thus allowing a larger number of different, otherwise overlapping processes, to exist in the TLB at any one time. The inventive solution is effected by exclusive-ORing an eight bit designation identifying the user (designated the ASID for "address space identification" code) with bits 17-24 of the virtual address from the integer ALU. The bit wise logical exclusive-OR operation is performed with the bits of the ASID reversed, that is, bit 24 of the virtual address is exclusive-OR'd with bit zero of the ASID, etc. The result, from the exclusive-OR hasher circuitry 310, designates bits 4-11 of the TLB address. The remaining four low order bits of the TLB address are derived from bits 13-16 of the virtual memory address 300. Each TLB entry includes not only the process page number, in the lower sixteen bits of the entry, but in addition, a TLB ASID, that is, the ASID associated with that TLB entry when the entry data was written in physical memory, and a TLB tag (seven bits in the illustrated embodiment) equal to the upper seven bits of the virtual memory address to which the entry corresponds. The TLB RAM entry further has a so-called "dirty bit" which indicates, at the current execution time, whether the data in the corresponding physical memory location was written by a user (as opposed to being the original entry read from virtual memory (e.g. disk)). If the physical memory had been user written, at any time during execution up to the current execution time the physical memory location is referred to as "dirty;" and if another process needs to access the same physical address for its data, the operating system must write that "dirty" data to disk before swapping data from the new page into memory at that physical address.

The apparatus uses a plurality of comparators to check for a data TLB miss. Referring to FIG. 12, a comparator 312 compares the present ASID, that is the present user program, to the user ASID associated with the presently stored data in physical memory as indicated by bits 16-23 of the TLB output entry. A second comparator 314 determines whether the TLB tag at bits 25-31 of the TLB entry correspond exactly to the high end, bits 25-31 of the virtual memory address. If either of these bit-wise comparisons fail, a TLB miss is declared by a logic circuitry 316.

The derived physical memory address, which, as noted above, is twenty-four bits in length, is truncated, so that the low order two bits are dropped; and the resulting twenty-two bit address is sent from the integer processor unit to the memory controller on physical address bus 118. The twenty-two bit quantity provides the word-in-bank address. At the same time, an additional six bits over lines 318 are provided during an earlier beat of the apparatus and identify the memory controller number and the bank number. These six bits are buffered in register 320 and become the lower six bits of the physical address, the three lowest bits giving the memory controller number and the next three bits giving the bank number on that memory controller. Since the number of controllers and the number of banks per controller can vary according to the illustrated embodiment of the invention, the integer processor can adjust its word-in-bank address, before transmitting the physical address, to fit the processor configuration. Thus, the memory controllers, having no information regarding the size of physical memory, expect the word-in-bank data bits to be properly aligned for whatever configuration is used. Therefore, the integer processor ALU0 must shift the word-in-bank field in accordance with the configuration being used. For example, an address 100 (octal) refers to controller zero, bank zero, word-in-bank eight, for a system having two memory controllers and four banks per controller. In a system with four memory controllers and eight banks per controller, the same address refers to controller zero, bank zero, and word-in-bank two. The difference reflects the number of bits required to identify the controllers and the bank within the controller. The first example requires one bit for the controller and two bits for the banks, while the second example requires two bits for the controller and three bits for the bank identification. In the first example, therefore, there are four bits available to identify the word-in-bank while in the second example only the two most significant bits identify the word-inbank.

In the illustrated embodiment of the invention, the lower virtual address bits are available from the arithmetic logic unit over lines 318 as if there were eight controllers and eight banks per controller. These bits then become the low order bits of the word-in-bank address. If the memory configuration is less than the maximum identified, the word-in-bank must be shifted to the left by an appropriate number of places. Shifting increases the word-in-bank so that the memory controller being addressed accesses the correct word from its bank of DRAM's.

As noted above, program execution and memory operations herein are all pipelined. Accordingly, memory operations can be issued in successive beats, or in the same beat if rhey do not address the same memory controller. At any time during program execution, several different memory operations can be, and in general will be, at various stages of completion in the memory pipeline. The detection of a TLB miss does not occur, however, during the first stage (or beat) of the memory pipeline. Thus, when a TLB miss is detected, the operating system must do more than merely swap data as needed; because while those memory accesses which were initiated after the memory access giving rise to the TLB miss should be flushed and restarted in the pipeline; while those memory accesses which were initiated prior to the memory access which resulted in the TLB miss should be allowed to complete. In order to quickly and advantageously re-execute those memory accesses which were initiated after that memory access which resulted in the TLB miss, a trap code procedure is initiated and the system enters a so-called "trap mode."

The microcode procedure reissues those operations which were not completed and returns the processors to the state they were in when the memory access resulting in the "trap" or TLB miss occurred. Since the memory pipelines cannot be and are not "frozen" instantly when an access violation is detected, memory operations that were started after the one causing the violation, but before the violation was detected, must, in effect, be replayed. It is important, however, for system efficiency, that recovery hardware and trap code processing be implemented as quickly as possible.

In accordance with the claimed invention, the processor herein provides for fast recovery and replaying of the instruction stream through the use of two history queues. The queues can be read by the microcode trap code to prevent loss of data and to quickly restore the processors to normal operation. There are two history queues associated with each integer unit. The queues operate in a FIFO manner with each beat of execution storing specific data generated by the processor and available during that machine cycle. The queues, in accordance with the illustrated embodiment of the invention, need only be four deep. Thus, the queues at the end of any machine beat contain data from the previous four beats of execution. The oldest data entry that can be read out of the queue contains data generated four beats earlier, the second oldest data is from three beats earlier, etc.

The two queues for each processor are denoted as a virtual memory address queue 326 and a status queue 328. The virtual memory address queue stores the virtual memory address which is generated by ALU0 during each memory access. The status queue stores OP code and error information, whether or not there was a TLB miss, whether or not the memory operation was "dangerous" as defined below, and whether or not the operation was a read or a write, etc.

The use of the history queues is not limited to a TLB miss. Two other circumstances can effect what will be viewed by the apparatus as a TLB miss and occur after the arithmetic logic unit produces its virtual memory address. One such circumstance is a parity error in the TLB entry. In the illustrated embodiment, the TLB entry has thirty-two bits of data. In addition, four parity bits are provided and those parity bits are compared with the parity computed for the entry in a parity generation hardware. If there is a mismatch, a trap must be taken to reissue the memory reference.

A trap must also be taken when an alignment error occurs. An alignment error is detected when the virtual address generated by the arithmetic logic unit has either of its two lower bits set or, if the memory operation is a sixty-four bit wide operation, any of its lower three bits set. The alignment error results because the memory address sent to the memory controllers is a byte address but must define a full word address (recalling that a word has four bytes of data) and therefore must have a value zero mod 4. In other words, the virtual address must be aligned on a word boundary or the memory will return the incorrect data. If the memory address relates to a sixty-four bit load or store operation, the address must correspond to an even word boundary, that is, must have a value zero mod 8. An alignment error thus causes a trap because a stored sequence of instructions is required to "package" two thirty-two bit words of data, returned from the memory system, to produce the thirty-two bit non-aligned word required by the instruction. (For a sixty-four bit wide load or store, the trap code packages three thirty-two bit words of data.)

Figure 13:
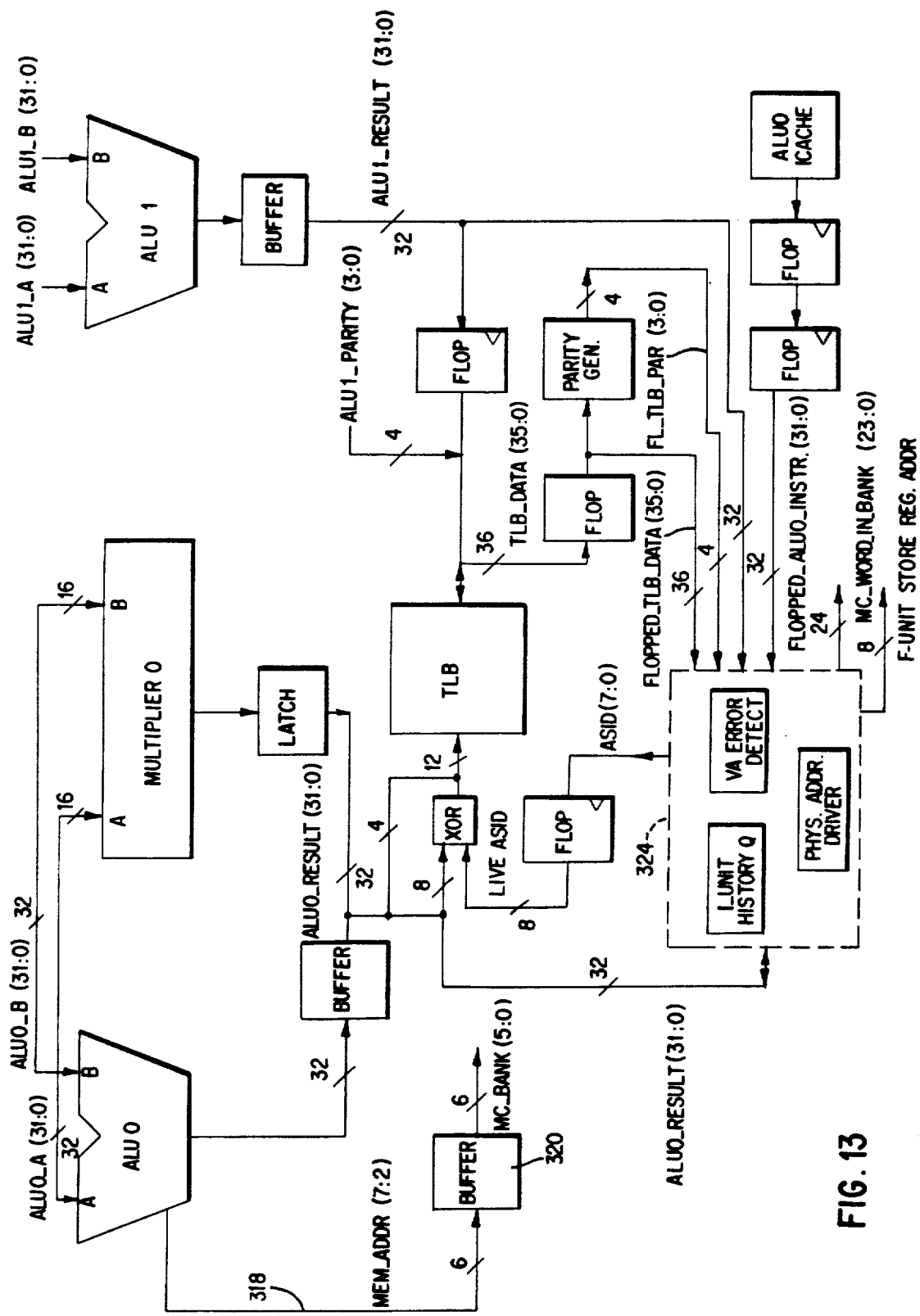
FIG. 13 is an electrical block diagram illustrating the operating elements for implementing the history queue according to a preferred embodiment of the invention.
Figure 14:
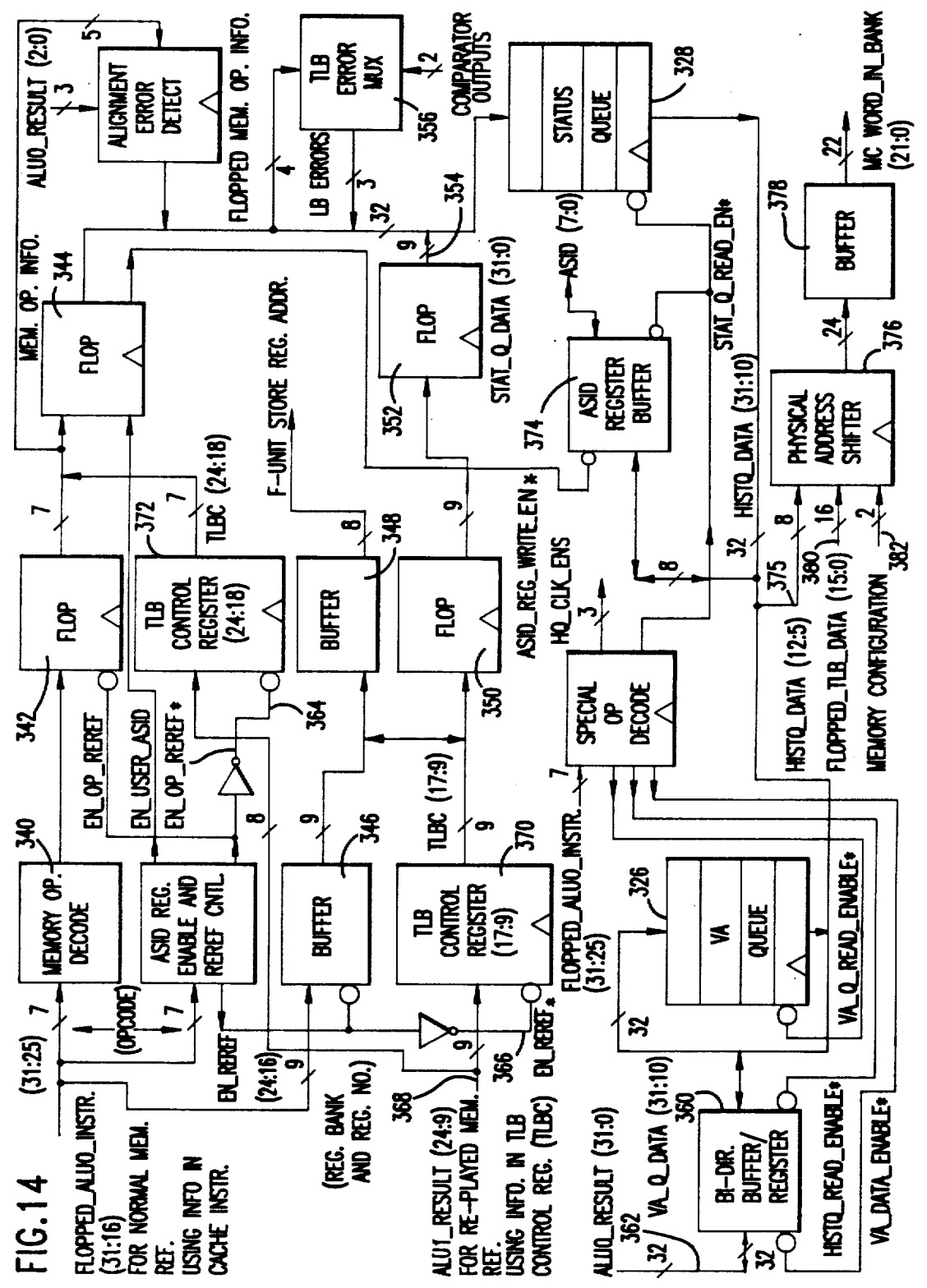
Figure 15:
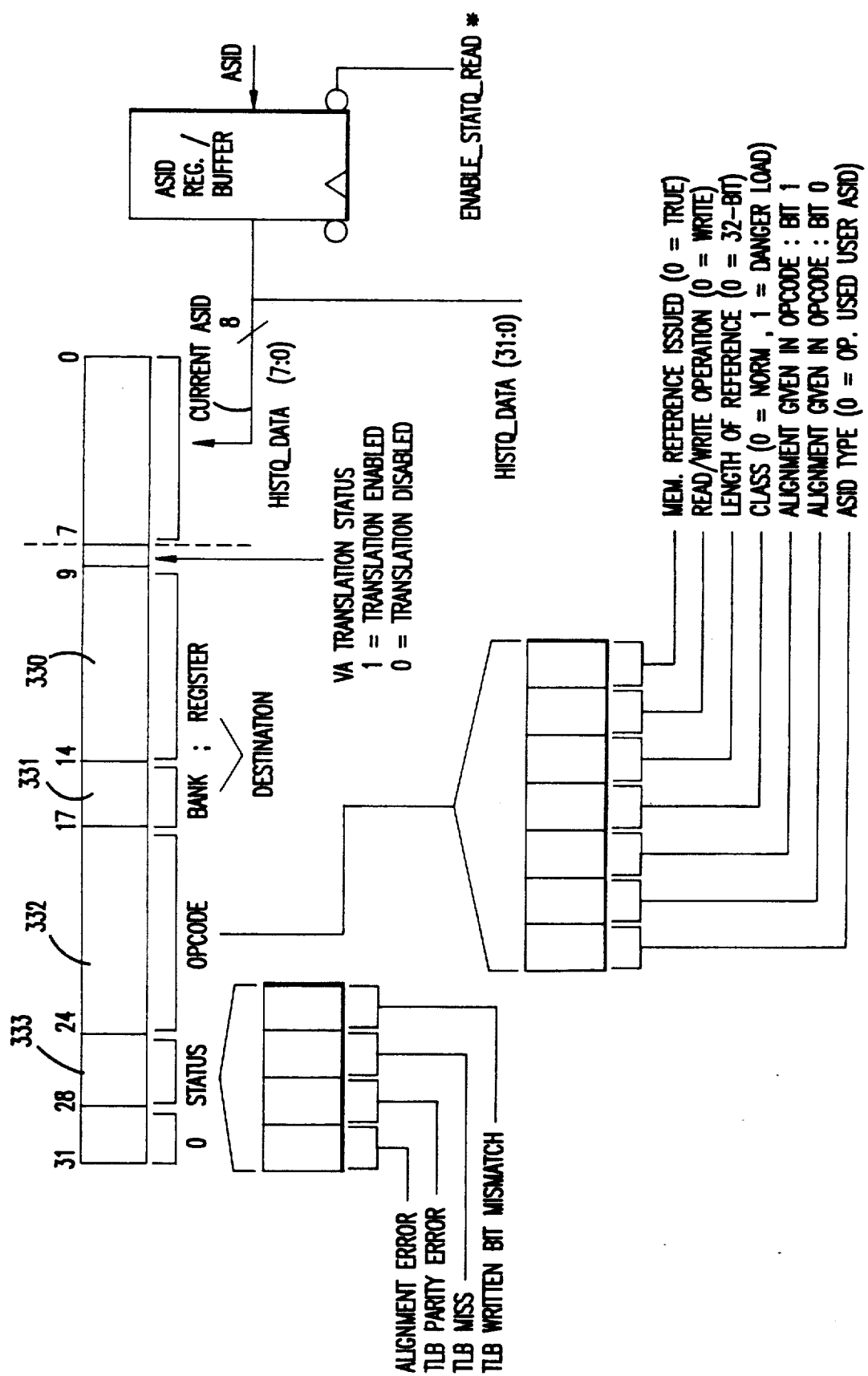
FIG. 15 is a representation illustrating the elements of the status queue data word in accordance with a preferred embodiment of the invention.

Referring to FIG. 13, each integer processor thus has associated therewith a memory recovery hardware 324 including both the virtual address queue 326 and the status queue 328 (FIG. 14). Each queue is four registers deep and the operation of the registers enables the system to recover from a TLB miss or alignment error quickly and reliably. Referring to FIG. 15, the data stored in the status queue includes destination register data 330 in bits 9-14, destination bank data 331 in bits 15-17, OP code data 332 in bits 18-24, and status data 333 in bits 25-28. (Bits 0-7 and 29-31 are not presently used.) The register data identifies the register in the selected register file to which the data was written or from which it was read; and the bank data identifies the register file (identifying the integer or floating point register file of a selected cluster) to which the data is being written or from which it was read. The OP code data indicates for the instruction whether a memory reference had been issued, whether the operation is a read or a write operation, the length of the reference, the class of operation, the alignment given in the OP code, and the user type. The status data 333 provides information regarding the type of error which caused the trap to have been taken.

Referring now to FIG. 14, for each memory operation, the high order bits of the instruction are decoded in a memory operation decode circuitry 340 and serially passed, in normal operation, to storage registers 342 and 344. Correspondingly, the destination register "bank" and register number are obtained from the instruction and stored, in normal operation, in buffer memories 346 and 348. The output of the buffer memory 348 provides a floating point processor storage register address. The destination register "bank" and register number are also stored in a sequence of storage registers 350 and 352. In the absence of a trap condition, this data is then stored in the status queue 328 along lines 354, with information, if any, from a TLB error multiplexor 356 and an alignment error detection element 358. Simultaneously, the virtual address derived by the ALU passes through a bidirectional register 360 from the ALU result line 362 and is stored in the virtual address queue 326. If a "trap" is not taken, the data stored in the status queues simply cycles through the queues and does not further impact upon operation of the equipment.

In the event, however, that a TLB error condition is detected, the microcode trap allows the memory operations initiated prior to the memory operation causing the trap to complete and then restarts the memory load cycle after the system loads the needed data into physical memory. Once the needed data is in physical memory, the operation causing the TLB miss is replayed by toggling the enable signals on lines 364 and 366 so that data corresponding to the ALU1 result line 368 flows into the TLB control registers 370, 372. This data is provided from the status queue 328 through the bidirectional buffer register 360 and the ALU circuitry. In this condition, therefore, an ASID register 374 and the TLB control register, which has two sections, 370, 372, provide the necessary OP code and data destination information while the virtual address is provided by the virtual address queue FIFO 326 over lines 375 to a physical address shifter 376 and a buffer 378 to provide the twenty-two bit memory controller word-in-bank data. The physical address shifter 376 receives the lower order virtual memory address bits from the virtual address queue and combines them with the stored and flopped TLB data over lines 380 which, in combination with the memory configuration signal over line 382, enables the twenty-four bit physical address to be generated.

Throughout this time, the ASID "live user" or "present user" data is available from the ASID register buffer 374 which enables the necessary ASID check to take place.

In case of an alignment error, as noted above, a microcode trap is also taken. The trap code in that instance, as intimated above, reads two (or three for a sixty-four bit wide memory reference) words from memory and manipulates them in several registers of the I and F units for providing the correct data output.

There further exists a class of memory load operations called "dangerous" loads. These loads will cause assertion of a memory access violation signal but the data will never be loaded. Execution will continue uninterrupted even though there is a TLB miss or a misalignment, and even though an access violation is asserted and the memory controller halts its pipeline. No trap is taken to account for a dangerous load.

A dangerous load can occur, for example, when a loop is "unrolled." Here, because the compiler is smart enough not to schedule other memory operations which will be cut off by the pipeline as a result of the access violation from a dangerous load, the pipeline can schedule the "if" test which checks for the end of the loop after the memory reference has been issued. Thus, the memory may attempt to load from an address beyond the memory area allocated for the user's array data and this can result in an access violation. The memory pipeline will be frozen, although earlier memory operations will be allowed to proceed and complete. The trap code, however, is never executed since, by the time the trap occurs, the process execution has determined that the loop will terminate and hence, that it will branch on the "if" test elsewhere in the program. The CPU thus does not take the trap because the data at the virtual address produced by the load instruction which created the access violation is not needed or wanted. The information in a dangerous load op code is decoded so that no trap is taken.

The Multiway Jump

The process of performing highly parallel processing is limited by its ability to compact operations which include conditional jumps. Typically, conditional jumps occur every five to eight operations in a typical sequential program and thus if more than five or so operations are compacted, a mechanism is need to pack more than one jump into a single VLIW. Without such a mechanism, the ability to provide highly compact parallel processing by the use of very long instruction words would be severely limited.

A typical sequence provides for two jumps which are initially sequential in a source program. If they are to be implemented during a single instruction cycle, a priority relationship must be established between them which defines to which target address to branch in case one or more of the conditional branch tests is true. A highest priority address whose condition is true then defines the next address for execution. The priority relationship is typically driven by the original ordering of the tests in the sequential program. This can be easily understood by the following example.

Consider a program application in which two tests are packed together into one instruction cycle. The test that was originally first in the sequential program must have the higher priority. Thus in the original sequential program, if the first test were true, the second branch, even if it tested true, would never have been performed. Therefore, when the two branches or conditional jumps are packed together, the results of the second and lower priority test are ignored if the first and higher priority test is true.

In accordance with the illustrated embodiment of the invention, the method for encoding the priority relationship and arbitrating among multiple tests to find the highest priority test which results in a true condition is performed with only two levels of logic gates. The apparatus separates the computation of the tests for deciding whether to take a branch from the calculation of the branch address. This is performed without any limitations upon the "condition codes." The architecture uses a pair of registers known as branch bank registers 80 and 82 (FIG. 3). In the illustrated embodiment, each branch bank contains eight one-bit registers which can be compared as is described in more detail below.

In the illustrated embodiment, when N conditional jumps are performed in one instruction cycle, there are provided N+1 independent destinations. The target address of each of the N jumps, and the fall through or the next program counter (PC) address, which occurs when none of the tests are true, define the N+1 destinations. In the illustrated embodiment, where there are four processors, N equals 4. When more or less processors are employed, the value of N will change accordingly. The global controller generates the fall through address, that is, the next program counter address.

Figure 16:
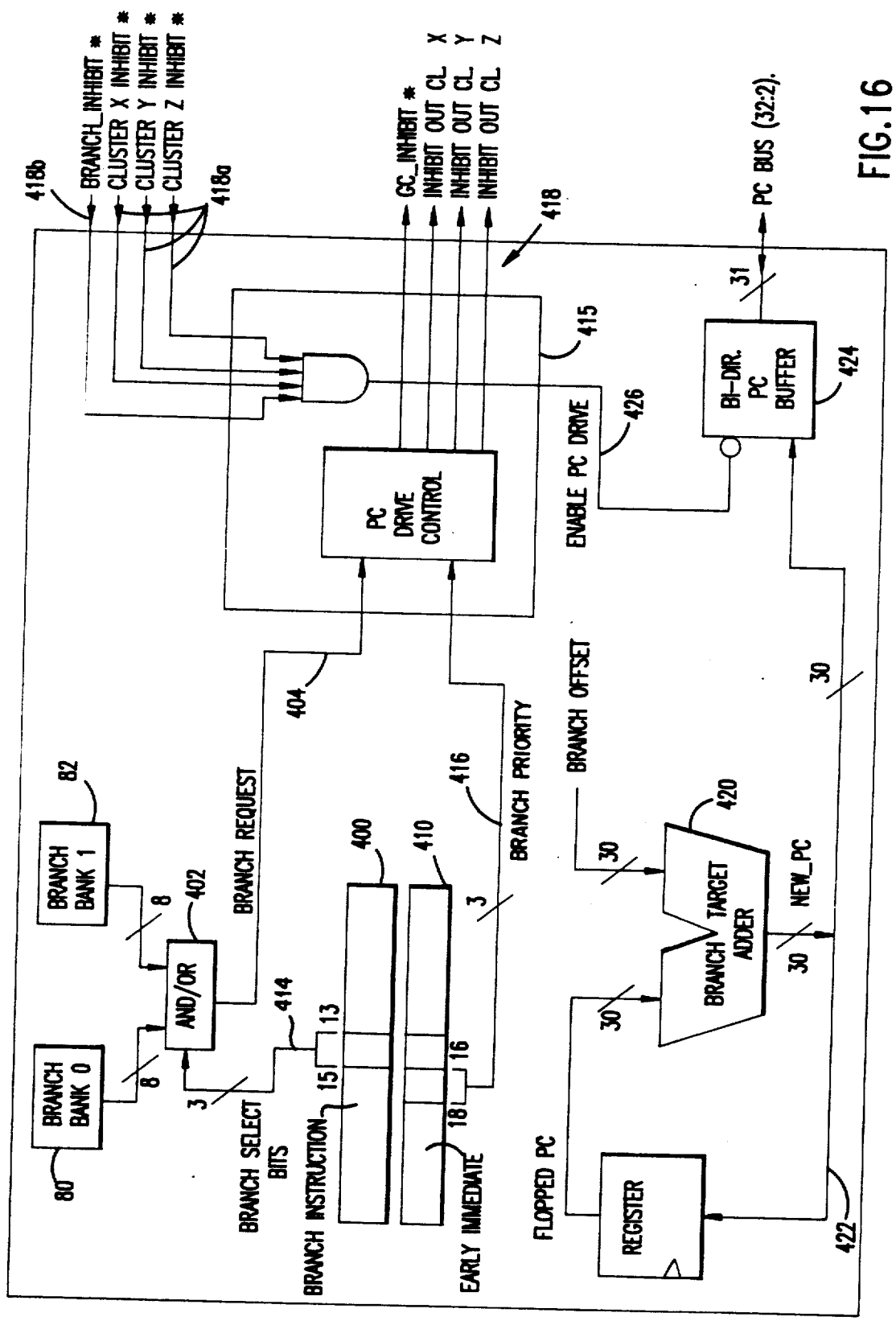
FIG. 16 is an electrical block diagram of the integer unit branch logic and program counter address generation circuitry according to a preferred embodiment of the invention.
Figure 17:
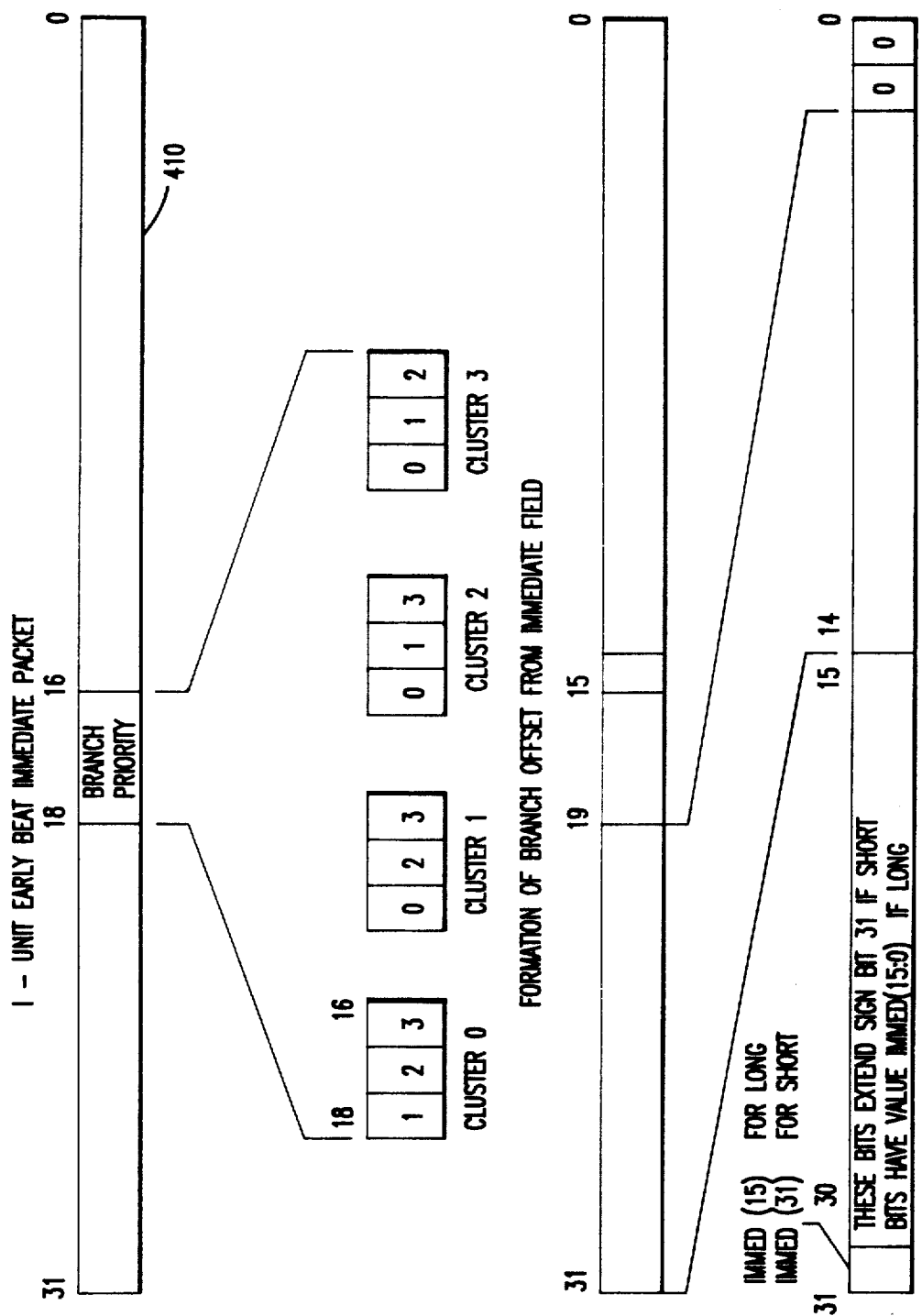
FIG. 17 is a pictorial representation of the data in the instruction unit early beat immediate packet according to a preferred embodiment of the invention.

In the illustrated embodiment of the invention, each processor performing a potential branch instruction operates upon that instruction during its early beat and the operation is performed by the integer ALU's. Referring to FIG. 16, a branch instruction 400 designates, at bits 13 through 15, a register of each eight bit branch bank, the same registers of each branch bank 78, 80; and the two registers are AND'd or OR'd in a circuitry 402 depending upon their register number. Thus registers 0, 2, 4, and 6 are always AND'd and registers 1, 3, 5, and 7 are always OR'd. The registers will have been previously loaded by the associated ALU0 and ALU1, respectively. Thus, the branching conditions (e.g. a register is positive) are placed in the register of the branch bank selected by the instructions for later use during branch testing. The branch test output from the AND/OR circuitry 402 over lines 404 is the branch request. Referring to FIG. 17, the integer unit early beat immediate field 410 provides the relative priority of the associated branch instruction with respect to those branch instructions of all of the other units. Thus, the process or cluster derives from bits 16-18 of the field its priority relative to each of the other (three) clusters in the system. A "one" in a bit position indicates, for example, that it has priority over the another cluster in the hardware while a zero indicates that it does not have priority over the other cluster. Thus, that cluster, which has in bits 16-18 of its early beat immediate field a sequence of all ones, has priority over each of the other clusters in the field. The early immediate field also provides the address offset, at bits 19-31, for determining the address to which a branch will be taken should that processor have priority as well as a true branch condition. This will be described in more detail hereinafter.

According to the illustrated embodiment of the invention, therefore, and referring to FIG. 16, each integer processor has a first and a second branch bank 80, 82 associated respectively with the first and second integer ALU. The outputs of the branch bank are directed to a logic circuitry 402 which, in response to the branch test designation of the branch instruction over lines 414, selects one bit of each register to be AND'd or OR'd together and provides the result as an output over branch request line 404. Simultaneously, the apparatus determines the branch priority, using a priority circuitry 415 and the three bit branch priority signal over lines 416. The four line output of a PC drive control 418 of priority circuitry 415 provides signals 418 to each of the other processor clusters as well as to the global controller. These signals will either inhibit operation of one or more of the other controllers or allow one or more of them to continue operation. Similarly, this cluster will receive data lines 418a from each of the other processors performing a branch calculation as well as from the global controller (over a line 418b) which can operate to inhibit branching. The signals on lines 418 will inhibit another processor from executing a branch if the branch test for the processor is true and this processor has priority over the other processor in the system. If the test is false, or if this unit does not have priority over another processor, the corresponding inhibit signal on line 418 is not provided.

Simultaneous with the determination of which cluster has both priority and a condition which tests true, each cluster executing a branch operation further determines what the new program counter (PC) would be should it control the branch. That determination is made by taking the previous program counter value and adding thereto a branch offset derived from bits 19-31 the early immediate field 410 (FIG. 17). This is referenced to as a short form immediate field. In the event that a long immediate field is employed, as indicated by bit 31 of that field, bits 15-30 of the branch offset are derived from bits 0-15 of the immediate field. Typically, however, the long form of word is not employed since the immediate field is also used by other instructions of the processor. Once the new PC has been generated by an ALU 420, for example ALU 1, the result is placed on lines 422 for transfer by a bidirectional PC buffer 424 should this processor be the processor which determines the next program counter value. That determination is made by the enable drive signal over lines 426. Accordingly, therefore, multiple branch instructions can be simultaneously handled in a single beat of the apparatus and in particular the determination of the value of the next program counter word is performed independently of the determination of which unit shall provide that value over the PC bus 428. This saves substantial time and allows the processing and execution to continue "substantially without a lost beat."

Figure 18:
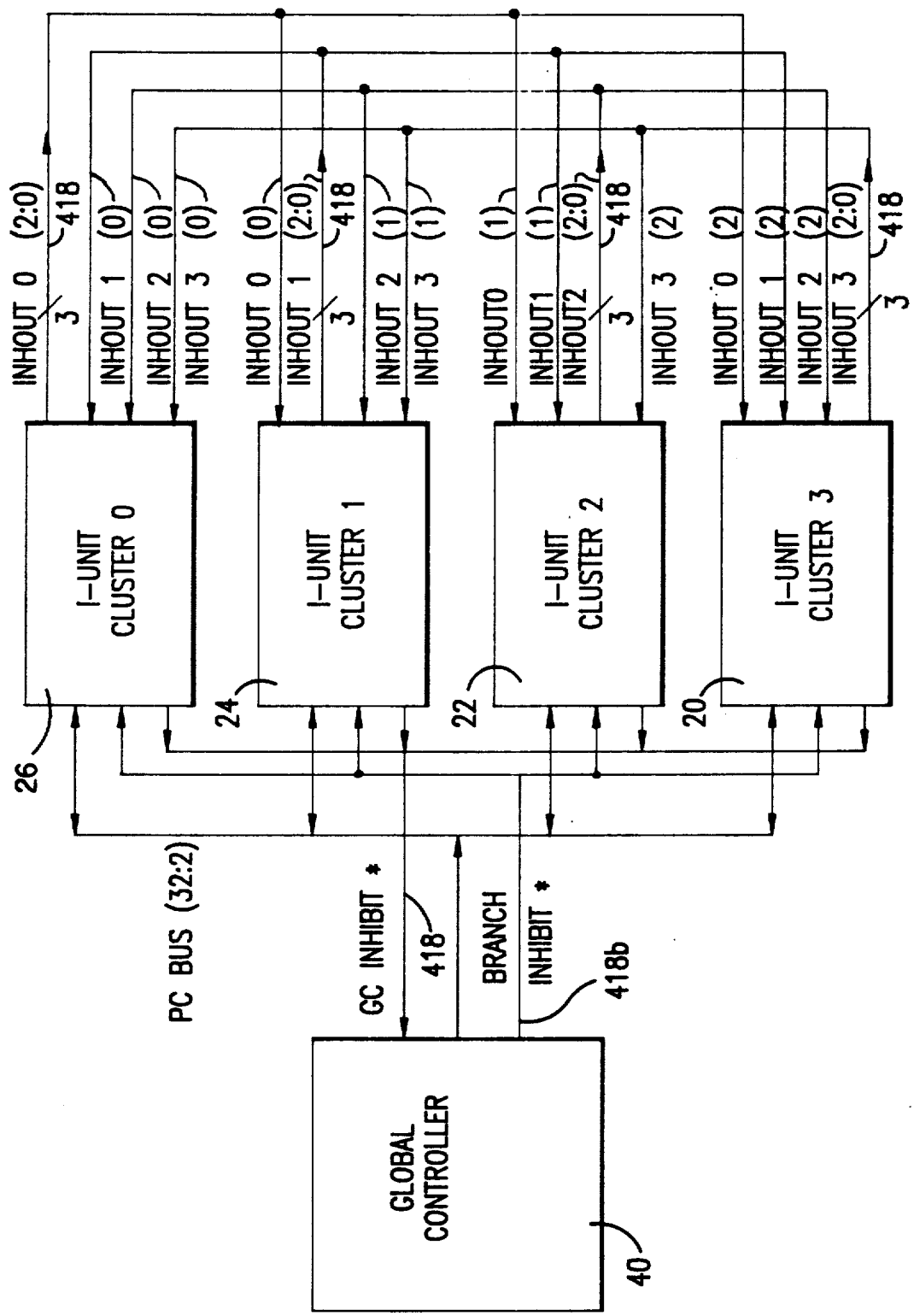
FIG. 18 is an electrical block diagram illustrating the interconnections of the integer processing units and the global controller for generating the next program counter address according to a preferred embodiment of the invention.

Referring to FIG. 18, the total processor structure which enables high speed resolution of a multiway branch provides for the global controller 40 to communicate the program counter value to each of the integer unit processors 20, 22, 24, 26 over lines 428, to provide a branch inhibit signal over lines 418b to each of the processors when a branch is not to be taken irrespective of the results of the branch test (for example, a branch is not taken when a cache miss occurs), and for receiving from the cluster processor units a global controller inhibit signal over one of lines 418 which informs the global controller that a branch will be taken. The various processor units also interconnect with each other over lines 418 as noted above, to provide each of the other processors with inhibit signals which, when asserted, prevent that other processor from generating the next program counter value. The inhibit signal, as noted above, is asserted when a processor has both higher priority and a branch condition that tests true.

Additions, subtractions, deletions, and other modifications of the described invention will be apparent to those practiced in the art and are within the scope of the following claims.

What is claimed is:
1. A cache miss engine for
a data processing system having an instruction cache, said instruction cache storing, in a distributed fashion, a plurality of instruction fields making up an instruction word, an interleaved memory system comprising a plurality of memory controllers, each controller controlling a plurality of memory banks, and said memory system able to output a plurality of data words each machine cycle, at least one control processing unit, and said instruction words being stored in a variable length compacted format in said memory system and in a fixed length format in the instruction cache, said variable length format including a decoding key and a plurality of fixed length non-zero instruction fields, said cache miss engine comprising means for reading said decoding key, means for reading said instruction fields in a block mode for transmission to said instruction cache, means for decoding said decoding key for generating destination tags for each of said read instruction fields, and means for associating a said destination tag with each read instruction field for denoting a storage destination of said instruction field in the distributed instruction cache.

2. The cache miss engine of claim 1 further comprising timing means for providing a said destination tag for simultaneous transmission with said associated instruction field on system bus lines.

3. The cache miss engine of claim 1 further wherein the data processing system comprises a plurality of data processors, and said cache miss engine associating means further comprises means for identifying, in the destination tag, the data processor and distributed cache memory section to which the associated instruction field is directed.

* * * * *